(12) United States Patent   (10) Patent No.: US 7,481,362 B2
Fujieda et al.                  (45) Date of Patent:    Jan. 27, 2009

(54) COMMUNICATION CARD SYSTEM, COMMUNICATION SYSTEM, AND WEB INFORMATION TRANSMISSION AND PROCESSING DEVICE

(75) Inventors: Isao Fujieda, Tokyo (JP); Tetsuya Nojima, Chigasaki (JP)

(73) Assignee: Networks Plus, Inc., Tokyo (JP)

( * ) Notice: Subject to any disclaimer, the term of this patent is extended or adjusted under 35 U.S.C. 154(b) by 498 days.

(21) Appl. No.: 10/524,845

(22) PCT Filed: Nov. 14, 2002

(86) PCT No.: PCT/JP02/11898

§ 371 (c)(1),
(2), (4) Date: Feb. 18, 2005

(87) PCT Pub. No.: WO2004/019248

PCT Pub. Date: Mar. 4, 2004

(65) Prior Publication Data

US 2006/0046782 A1    Mar. 2, 2006

(30) Foreign Application Priority Data

Aug. 21, 2002  (JP) .............................. 2002-240611
Oct. 1, 2002   (JP) .............................. 2002-289046

(51) Int. Cl.
*G06K 5/00*    (2006.01)
(52) U.S. Cl. ..................................... 235/380
(58) Field of Classification Search ................ 235/380; 283/92, 114
See application file for complete search history.

(56) References Cited

U.S. PATENT DOCUMENTS 5,984,367  A     11/1999  Barnhart et al.
6,973,626  B1 *  12/2005  Lahti et al. ................. 715/763

FOREIGN PATENT DOCUMENTS

| JP | 11-327868   | 11/1999 |
| JP | 2001-312657 | 11/2001 |
| JP | 2002-160479 | 6/2002  |
| JP | 2002-163409 | 6/2002  |

OTHER PUBLICATIONS

Taku Katoh, et al., "On Extension and Applications of Visual Secret Sharing," Technical Report of IEICE, Sep. 1995, pp. 41-48, vol. 95, No. 240, ISEC 95-19, The Institute of Electronics, Information and Communication Engineers.

* cited by examiner

*Primary Examiner*—Daniel A Hess
(74) *Attorney, Agent, or Firm*—Oliff & Berridge, PLC

(57) ABSTRACT

A communication card system (101) comprises a second communication card (2a), a second information processing system (3a), and a user terminal device (51). The second information processing system (3a) synthesizes hidden image data to be communicated in main image data for display and provides such composite image data. An image display/recognition system (5) includes the user terminal device (51a) which displays main image data and displays hidden image data in a invisible manner. The second communication card (2a) having an optical medium (23a) of optically transmissive characteristic is used for visually recognizing hidden image formed by hidden image data displayed on the user terminal device (51a).

3 Claims, 23 Drawing Sheets

COMMUNICATION CARD SYSTEM, COMMUNICATION SYSTEM, AND WEB INFORMATION TRANSMISSION AND PROCESSING DEVICE

FIELD OF THE INVENTION

The present invention relates to a communication card system, a communication system, and a web-based information transmission/processing device, which allows use of a hidden image and a tool for making the hidden image clearly visible so as to enable communication with customer(s).

More specifically, the present invention relates to a communication card system, communication system, and web-based information transmission/processing device, which are of a high scalability and allows a user's terminal device to be directly used for making a hidden image visible, thereby giving a low-cost maximum performance.

BACKGROUND ARTS

In the past, it has been well known that many entrepreneurs in various fields have effected their own marketing activities by making full use of various kinds of marketing tools and the like in an attempt to conduct market research and invite people to become their loyal customer or registered members.

In this context, an example of marketing will be explained, where a brochure is used as one of marketing tools. Namely, for instance, an entrepreneur distributes to each of customers a brochure giving his or her URL (Uniform Rescue Locator; i.e. an Internet standard means for indicating a location where a desired information exists on the Internet and a guidance for access to the information). Then, the customer inputs the URL in the brochure into his or her terminal device and gains access to a website of the entrepreneur. Upon such customer's access being made, the entrepreneur collects information about the customer on the website and thereby conducts marketing research, invites the customer to become a registered member, and so forth (hereinafter, this shall be referred to as a "first prior art").

Further, another example of marketing will be explained, where a direct mail is used as one of marketing tools. In this case, an entrepreneur sends to each of customers a direct mail giving his or her URL likewise as stated above. Then, the customer inputs the URL in the direct mail into his or her terminal device and gains access to a website of the entrepreneur. Upon such customer's access, the entrepreneur collects information about the customer on the website and thereby conducts marketing research, invites the customer to become a registered member, and so forth (hereinafter, this shall be referred to as a "second prior art").

Still another example of marketing will be explained, where a CD recording medium (i.e. compact disc) is used as one of marketing tools. In such case, as an alternative mode of the marketing tool, an entrepreneur records his or her URL in a CD medium, as similar to the foregoing examples, and sends the CD medium to each of customers. Then, the customer operates his or her terminal device to record therein such URL given in the CD and gains access to a website of the entrepreneur. Upon such customer's access, the entrepreneur collects information about the customer on the website and thereby conducts marketing research, invites the customer to become a registered member, and so forth (hereinafter, this shall be referred to as a "third prior art"). In this example, there is eliminated the necessity to manually input the URL, and therefore, it can be expected that the rate of access to the website will become increased higher than in the case of the foregoing brochure or direct mail.

However, the afore-stated first prior art has been found defective in that 1) no new attractive aspect is attained due to many other similar cases being seen around, 2) labor costs are incurred for distribution of the brochures, and 3) the tool distributed to the customers contains nothing but the notification of URL, as a result of which, the tool itself has no other useful functions and remains the same as ever, not appealing to the customers.

Further, the second prior art has been found defective in that 1) a rate of customers' responses to the direct mails is low, 2) the number of customers' accesses to the website is small, and 3) the entrepreneur can not obtain so much profits in return for his or her considerable amount of labors for sending the direct mails. Still further, such second prior art will not cause any further business development, such as integration of entrepreneur's website with relevant shops or reintroduction of goods or services.

In addition, the third prior art has been found defective in that 1) it involves preparation of CD recording media and mailing or distribution of the same, thus resulting in a vast increase of costs, and 2) while the number of access to the website may become increased more than the foregoing first and second prior arts, an entrepreneur can not obtain a satisfactory result such as customers' registration.

It is therefore a purpose of the present invention to provide a communication card system, communication system, and web-based information transmission/processing device, which obviate the above-stated defects and is easily capable of: realizing effective guide and induction to an entrepreneur's website; constructing customer's database; providing questionnaire or quiz on a website; giving an incentive for playing action items including games on a website; and further, integrating the website with relevant shops and/or purchased items.

DISCLOSURE OF THE INVENTION

In order to achieve the foregoing purpose, there is provided a communication card system in accordance with an invention described in claim 1, which is characterized by being provided with:

a first communication card formed by a sheet bearing predetermined marks printed thereon, wherein the predetermined marks includes letters, graphics and signs, and the sheet has, provided in a localized region thereof, an optical medium in which a hidden image intended for communication purpose is plotted;

a first information processing system capable of transmission of an information input image data, the first information processing system being of such an arrangement that, subsequent to the information input image data being transmitted therefrom, and then, upon receipt of a collected information data written in the particular information input image data, the first information processing system is operable to transmit an image output data for causing emission of a color tone(s) which makes/make visible the hidden image in the optical medium, and that, when loading the collected information data, the first information processing system is operable to classify the collected information data in a predetermined way; and a user's terminal device having an information input means for allowing various kinds of information data to be inputted thereinto, a display means for displaying the information input image data and/or other data to be displayed, and a processing means for effecting various required controls and processing information data, wherein the communication card system is also characterized in that:

the fist communication card is distributed to customer(s);

the user's terminal device, when a URL indicated on the first communication card or other medium is inputted therein, effects operation which entails: making access to the first information processing system; then causing a predetermined information input image data to load to the particular user's terminal device from the first information processing system; causing indication of an information input image on the display means from the predetermined information input image data; and, upon a given information data having been inputted into the information input image via the input means, transmitting the given information data to the first information processing system; and further, the user's terminal device operates to emit a color tone(s) on and from the display means, the color tone(s) being based on an image output data transmitted from the first information processing system, so that a hidden image in the optical medium of the first communication card is made visible by the color tone(s) in such a manner as to permit visual perception of the hidden image, thereby providing a particular information to the customer(s) through the first communication card.

In order to achieve the foregoing purpose, there is provided a communication card system in accordance with an invention described in claim 2, which is characterized by being provided with:

a first communication card formed by a sheet bearing predetermined marks printed thereon, wherein the predetermined marks includes letters, graphics and signs, and the sheet has, provided in a localized region thereof, an optical medium in which a hidden image intended for communication purpose is plotted;

a first information processing system capable of transmission of an information input image data, the first information processing system being of such an arrangement that, subsequent to the information input image data being transmitted therefrom, and then, upon receipt of a collected information data written in the particular information input image data, the first information processing system is operable to transmit an image output data for causing emission of a color tone(s) which makes/make visible the hidden image in the optical medium, and that, when loading the collected information data, the first information processing system is operable to classify the collected information data in a predetermined way; and wherein the communication card system is also characterized in that:

the fist communication card is distributed to a customer(s); and the first information processing system effects operation which entails: transmitting a predetermined information input image data; then, upon receipt of a collected information data, transmitting an image output data for causing emission of a predetermined color tone(s), with such an arrangement that the hidden image of the first communication card and the emission of predetermined color tone(s) are used so as to enable communication with a customer(s).

In order to achieve the foregoing purpose, there is provided a communication card system in accordance with an invention described in claim 3, which is characterized by being provided with:

a second communication card formed by a sheet bearing predetermined marks printed thereon, wherein the predetermined marks includes letters, graphics and signs, and the sheet has, provided in a localized region thereof, an optical medium in which a hidden image intended for communication purpose is plotted;

a second information processing system capable of transmission of an information input image data, the second information processing system being of such an arrangement that, subsequent to the information input image data being transmitted therefrom, and then, upon receipt of a collected information data written in the particular information input image data, the second information processing system is operable to combine a data on the hidden image, which is to be sent to a customer(s), with a main image data to be displayed, so as to create an image output data which is adapted for causing only an image associated with the main image data to indicate in a visible manner, while causing the hidden image data to indicate in an invisible manner, then transmitting the image output data, and further, the second information processing system, after having loaded the collected information data, operates to classify the collected information data in a predetermined way; and a user's terminal device having an information input means for allowing various kinds of information data to be inputted therein, a display means for displaying the information input image data and/or other data to be displayed, and a processing means for effecting various required controls and processing information data, wherein the communication card system is also characterized in that:

the second communication card is distributed to a customer (s);

the user's terminal device, into which is inputted a URL indicated on the second communication card or other medium, is operable to execute the steps of making access to the second information processing system; then causing a predetermined information input image data to load into the particular user's terminal device from the second information processing system; causing indication of an information input image on the display means from the predetermined information input image data; and upon a particular information data having been inputted in the information input image via the input means, transmitting the particular information data to the second information processing system; and further, the user's terminal device is operable to receive an image output data transmitted from the second information transmission processing device, and causes indication of a main image data on the display means, while simultaneously causing indication of a hidden image data in an invisible manner on the display means, with such an arrangement that a hidden image indicated on the display means is made visually perceivable by means of the second communication card, thereby providing a predetermined information to the customer(s) via the second communication card.

In order to achieve the foregoing purpose, there is provided a communication card system in accordance with an invention described in claim 4, which is characterized by being provided with:

a second communication card formed by a sheet bearing predetermined marks printed thereon, wherein the predetermined marks includes letters, graphics and signs, and the sheet has, provided in a localized region thereof, an optical medium in which a hidden image intended for communication purpose is plotted; and a second information processing system capable of transmission of an information input image data, the second information processing system being of such an arrangement that, subsequent to the information input image data being transmitted therefrom, and then, upon receipt of a collected information data written in the particular information input image data, the second information processing system is operable to combine a data on the hidden image, which is to be presented to customer(s), with a main image data to be displayed, so as to create an image output data which is adapted for causing only an image associated with the main image data to indicate in a visible manner, while causing the hidden image data to indicate in an invisible manner, then transmitting the image output data, and further, the second information processing system, after having loaded the collected information data, operates to classify the collected information data in a predetermined way;

wherein the communication card system is also characterized in that:

the second communication card is distributed to a customer (s);

the second information processing system effects operation which entails: transmitting a predetermined information input image data; and then, upon receipt of a collected information, transmitting an image output data for causing emission of a predetermined color tone(s), so that the second communication card and a hidden image indicated thereby effectively allows for communication with the customer(s).

In order to achieve the foregoing purpose, there is provided a communication card system in accordance with an invention described in claim 5, which is characterized by being provided with:

a web-based information transmission/processing device operable to execute processing which consists in: creating a hidden image data for causing indication of a hidden image in a predetermined area of an image being displayed; creating a filter image data for causing indication of a filter image which is to be emitted in a color tone(s) which makes/make the hidden image visible in other area than the predetermined area of the image being displayed; creating an information input image data; transmitting the information input image data; and, upon receipt of a collected information data concerning an information data required in the thus-transmitted information input image data, transmitting the hidden image data and the filter image data;

a user's terminal device(s) having an information input image for allowing various required information data to be inputted thereinto; a display means for displaying an information input image data and other data to be displayed; and a processing means for effecting various required controls and processing information data; wherein the web-based information transmission/processing device is connected with the user's terminal device(s) via a telecommunication system;

the communication system being characterized in that:

the user's terminal device(s) is/are operable to execute processing which consists in: making access to the web-based information transmission/processing device on basis of an URL inputted thereinto; causing a predetermined information input image data to load into the use's terminal device(s) from the web-based information transmission/processing device; causing indication of the predetermined information input image data on the display means; and, upon an information data having been inputted thereinto in response to the information required by the information input image data, transmitting the information data to the web-based information transmission/processing device; and further, the user's terminal device(s) is/are operable to cause indication of the hidden image data and the filter image data on the display means, wherein the hidden image data and the filter image data have been transmitted from the web-based information transmission/processing device in response to the information data transmitted to the latter, whereby the hidden image is made visually perceivable so as to provide an information intended for particular communication purpose.

In order to achieve the foregoing purpose, there is provided a communication card system in accordance with an invention described in claim 6, which is characterized by being provided with a means capable of: creating a hidden image data for causing indication of a hidden image in a predetermined area of an image being displayed and a filter image data for causing indication of a filter image which is to be emitted in a color tone(s) for making the hidden image visible in other area than the predetermined area of the image being displayed; and also transmitting the hidden image data and the filter image data to a telecommunication system in a direction to a user's terminal device which makes access to the web-based information transmission/processing device.

In order to achieve the foregoing purpose, there is provided a communication card system in accordance with an invention described in claim 7, which is characterized by being provided with a means operable to execute processing which consists in: creating: a hidden image data for causing indication of a hidden image in a predetermined area of an image being displayed; a filter image data for causing indication of a filter image which is to be emitted in a color tone(s) for making the hidden image visible in other area than the predetermined area of the image being displayed; and an information input image data; then transmitting the information input image data, and, upon receipt of a collected information data concerning an information data required in the information input image data, transmitting the hidden image data and the filter image data to a telecommunication system in a direction to a user's terminal device(s) which has/have made access to the web-based information transmission/processing device,

BEST MODE FOR CARRYING OUT THE INVENTION

Hereinafter, embodiments of the present invention will be described with reference to the annexed drawings.

[A Basic Concept of First Inventive Aspect]

Figure 1:
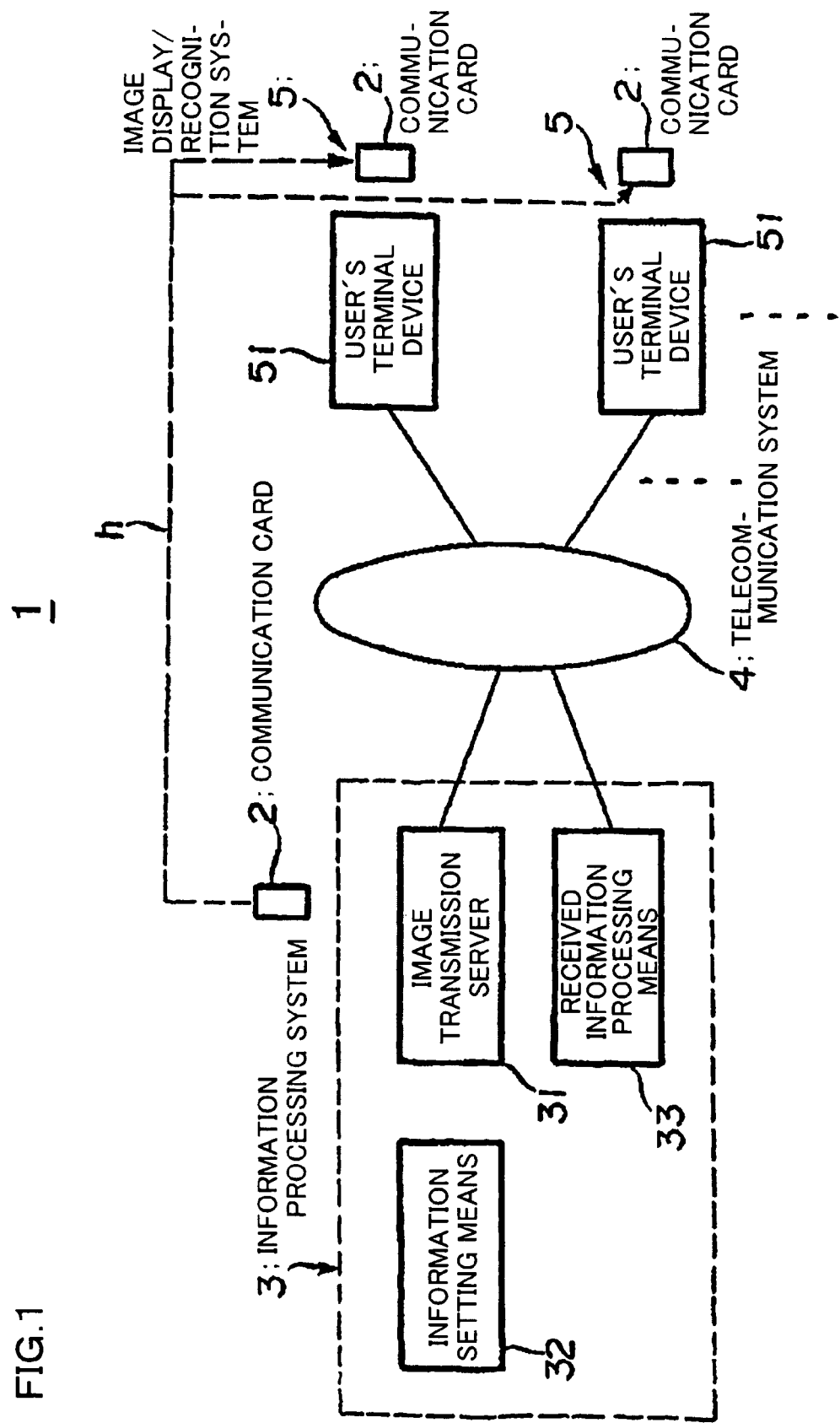
FIG. 1 is a block diagram illustrative of a network communication system in accordance with an embodiment of a first inventive aspect of the present invention.
Figure 2:
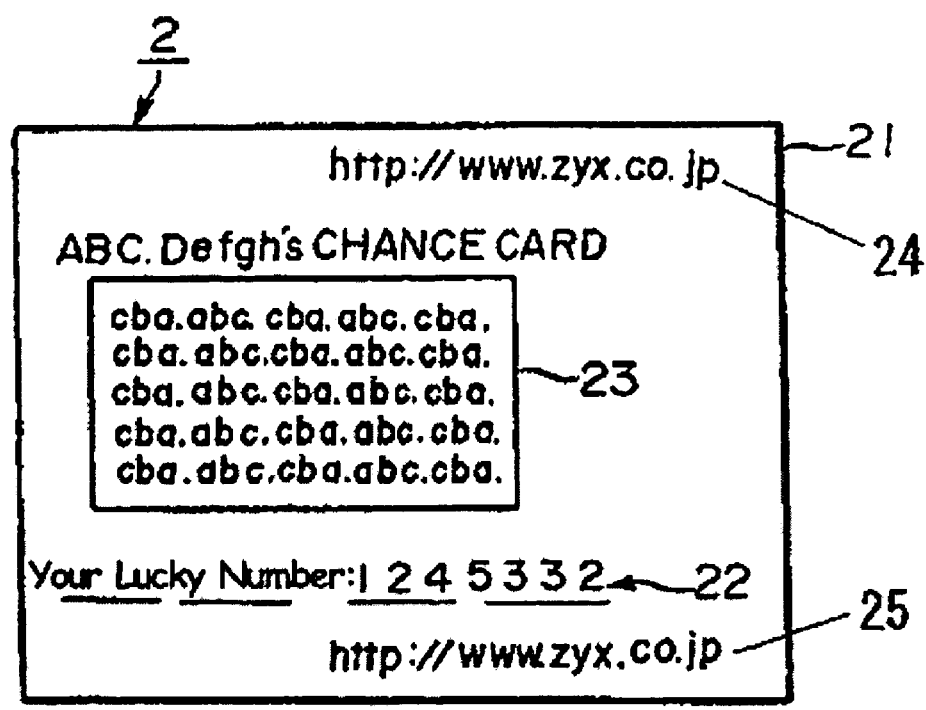
FIG. 2 is a plan view showing a makeup or formation of a communication card for use with the network communication system in accordance with the embodiment of the first inventive aspect of the present invention.

FIGS. 1 and 2 are intended to explanatorily illustrate a communication card system in accordance with a basic concept of a first inventive aspect of the present invention. The term, "the first inventive aspect", in this case refers to a system capable of causing a display means of a user's terminal device to emit a predetermined color tone, thereby enabling visual perception of a hidden image which is given in an optical medium of a first communication card, so that a particular information in that optical medium of first communication card may be provided to a customer.

FIG. 1 is a block diagram illustrative of a communication card system in accordance with the basic concept of the first inventive aspect.

In the FIG. 1, generically stated, the communication card system 1 in accordance with the basic concept of the first inventive aspect is comprised of: a first communication card 2; a first information processing system 3; and a plurality of image display/recognition systems 5, 5, . . . which are workable to recognize a displayed image. The afore-the first information processing system 3 may be connected with each of the image display/recognition systems 5, 5, . . . through a telecommunication system 4 capable of wireless communication including an Internet.

The afore-stated first communication card 2 is defined hereby to be a card which is to be provided and distributed by an entrepreneur (hereinafter, referred to as "information sender") to a user. (The card shall be used in such manner, hereinafter.) It should be understood that the FIG. 1 shows the state where the information sender distributes the first communication card 2 to a customer (hereinafter, referred to as "user") as indicated by the chain lines designated by a reference character h.

On the surface of the foregoing first communication card 2, there may be, for example, printed the above-noted URL and a predetermined mark(s) including a letter(s), a graphic(s), and a signal(s) (that is, more specifically, "name of the card", "name of company who issues the card", "description about the card itself", and "check bit number (i.e. "lucky number", for instance, which is indicated on the card as far as the drawings are concerned.)". The check bit numbers indicated or printed on the first communication card 2 are arranged differently per communication card 2 such that a plurality of the cards 2 differ in contents from one another. (The same applies to any case to be described hereinafter.) The check bit number itself is processed by a known technical means, and any further description thereon is omitted.

Also, the foregoing arrangement allows the information sender to use the afore-first communication card 2 and the first information processing system 3 so as to establish communication with customer by means of a given check bit number of the first communication card 2 and an image output data transmitted from the first information processing system 3.

Here, the first information processing system 3 may for example comprise: an image transmission server 31; an information setting means 32 for allowing a particular information to be set in the image transmission server 31; and a received information processing means 33.

While not shown, such image transmission server 31 is provided with a plurality of central processing units, main memories, input/output interfaces, hard disc devices, telecommunication devices, units of LAN (Local Area Network), and so forth. The hard disc devices in that image transmission server 31 each has, stored in memory, an operating system based on a given language and an image transmission application program for causing transmission of an image.

In the main memories of the image transmission server 31, the operating system in each hard disc device is expanded and stored, so that the foregoing central processing unit can execute the operating system to provide a basic operation in a predetermined manner, and further, an image transmission application program for processing an information data that has been received, which is installed in the hard disc device, is expanded and stored in the main memory, so that the central processing unit can execute that image transmission application program upon the operating system, thereby enabling execution of operation for the image transmission stated above.

The aforementioned information setting means 32 is also provided with a plurality of central processing units, main memories, input/output interfaces, hard disc devices, telecommunication devices, units of LAN (local area network), and so forth, though not shown. The hard disc devices in that image transmission server 32 each has, stored in memory, an operating system based on a given language and a received information processing application program for processing an information data that has been received.

In the main memories of the information setting means 32, the operating system is expanded and stored, so that the central processing units can execute the operating system to provide a basic operation in a predetermined manner, and further, a received information processing application program for processing an information that has been received, which is installed in the hard disc device, is expanded and stored in the main memory, so that the central processing unit can execute that received information processing application program upon the operating system, thereby enabling execution of the above-described operation for processing the received information.

The foregoing received information processing means 33 is also provided with a plurality of central processing units, main memories, input/output interfaces, hard disc devices, telecommunication devices, units of LAN (local area network), and so forth, though not shown, such that a central processing unit in the information setting means 33 will execute an operating system based on a certain language to provide a basic operation in a predetermined manner, and further, the central processing unit will execute an information setting application program on the operating system, thereby enabling execution of the above-described operation for setting information.

While not shown, the foregoing image display transmission server 31, the foregoing information setting means 32 and the foregoing received information processing means 33 are connected with one another via a LAN cable(s).

The abovementioned information setting means 32 allows required information data to be inputted therein, the information data for example including a data on description and drawings for explaining how to use the optical medium of the first communication card 2 or a data for causing generation of color tones which make visible a hidden image in the optical medium of the first communication card 2, and, after those information data has been inputted, the information setting means 32 operates to transfer the inputted information data to the image transmission server 31.

The image transmission server 31 is capable of transmission of an information input image data on the basic concept of an information data that has been inputted and set in the information setting means 32, and, after having transmitted the information input image data to the user(s), the server 31 is also capable of receiving a collected information written in the information input image data that has been transmitted to the user(s), and, after receipt of the collected information, transmitting to the telecommunication system 4 a data of description and drawings for explaining how to use the optical medium of the first communication card 2 and/or an image output data for causing generation of color tones which make visible a hidden image in the first communication card 2.

With regard to the afore-stated received information processing means 33, upon receipt of an information data transmitted from the image display/recognition system 5 via the telecommunication system 4 (or upon receipt of a collected information data written in the information input image data that has been transmitted therefrom), that particular received information processing means 33 is capable of classifying the afore-stated collected information data in a predetermined way. Further, in accordance with such received information processing means 33, when an information data of check bit numbers printed on the afore-stated first communication card 2 is transmitted thereto via the image display/recognition system 5 and telecommunication system 4, the received information processing means 33 itself can execute a lottery processing on the basic concept of the afore-said information data of check bit numbers and transmit a result of the lottery via the telecommunication system 4 to the afore-said image display/recognition system 5.

As shown in FIG. 1, the foregoing image display/recognition system 5 is provided with a user's terminal device(s) 51 which can generate a particular color tone based on the image output data transmitted from the image transmission server 31 of the afore-stated information processing system 3, so that exposure of the optical medium of the first communication card 2 to the color tone indicated on the user's terminal device(s) 51 results in visual perception of the hidden image in the optical medium of the first communication card 2. This user's terminal device(s) 51 may be a terminal device owned by the user or other terminal device owned by other user. Of course, it is essential that each user's terminal device 51 should be provided with an information input means for inputting various kinds of information data, a display means for displaying information input image data and/or other data to be indicated thereon, and a processing means for effecting various required controls and processing information data.

In the present embodiment, the image transmission server 31 may be owned by the information sender or not. In other words, any suitable means may be used, insofar as it enables communication between an information sender and users through the first communication card 2.

Further, the foregoing user's terminal device (s) 51 may, for example, be a desktop personal computer (hereinafter, referred to as "personal computer" or "PC"), a laptop PC, a mobile computer (computer of mobile type), PDA, or any one of other various kinds of terminal devices. In other words, each user's terminal device 51 may be any kind of terminal device insofar as it includes an information input means for allowing various relevant information to be inputted therein, a display means for displaying information input image data and/or other data to be indicated, and a processing means for effecting various required controls and processing information data.

The image transmission server 31 in the present embodiment is equivalent to an image transmission server of the type used by an electric communication business entity. Further, the user's terminal device(s) 51 may be an online karaoke device capable of two-way transmission, a CATV receiver capable of two-way communication, a television receiver capable of two-way communication, or the like, in which case, the information transmission section of the information processing system 3 may be a transmitter typically provided in a transmitting station.

FIG. 2 is a plan view showing a makeup or formation of the first communication card used in the communication card system in accordance with the basic concept of the first inventive aspect of the present invention.

As shown in this FIG. 2, the first communication card 2 may be a sheet 21 formed from a thin flat base material which is for example such a thin-plate-like substrate as paper, plastics, transparent film, or acrylic thin plate, and, on the surface thereof, there may be printed a predetermined mark(s) including a letter(s), a graphic(s), and a sign(s) (e.g. "name of the card", "name of company who issues the card", "corporate logo or image logo", "URL", "check bit numbers (i.e. "lucky numbers" indicated on the card as far as the drawings are concerned.)", "background pattern(s)", or "etc.". It is noted that, among those marks, the designation 22 stands for a check bit number. With regard to the check bit number printed on the lower region of the surface of the thus-formed sheet 21 as illustrated, the present system is programmed such that the numerical sequence in the check bit number varies from one sheet of the first communication card 2 to another sheet of the first communication card 2.

Further, as shown in FIG. 2, in accordance with the first communication card 2, an optical medium 23 of a predetermined square measure is provided on a localized area of the sheet 21. In that optical medium 23, a hidden image is plotted, which is intended for particular communication (or conveyance) purpose. Formation of this optical medium 23 is such that a certain hidden image is plotted in a predetermined ink on a thin light-transmissive plate formed by such a material as a transparent or semi-transparent film, acrylic, plastics, or vinyl, and further, other image is plotted on that hidden image in another ink of a different color than that of the afore-said predetermined ink.

In addition, in accordance with the first communication card 2, as shown in FIG. 2, URLs 24 and 25 are respectively printed on the upper and lower regions of the sheet 21.

It is noted that the hidden image in the optical medium 23 of the first communication card 2 is plotted in a color(s) which is/are in a complementary relation with a color tone(s) indicated on each of the user's terminal devices 51. Such complementary color relation is preset in a way that can never be noticed by a user.

A description will be made about the above-constructed communication card system of the present first inventive aspect as well as about operations of the information processing system and image display/recognition system with reference to FIGS. 1 and 2.

Now, what is to be done first of all by the information sender is to prepare the above-described first communication card 2 according to predetermined processing steps and given details of communication (conveyance) that he or she wishes to transmit.

Thereafter, the information sender inputs and sets an information data into the information setting means 32 of the information processing system 3, the information data containing a diagram(s) and/or a description(s) on how to use the first communication card 2, and/or an audio data for explanation of such use of first communication card 2. Further, into that information setting means 32 of the information processing system 3, the information sender inputs and sets an information data associated with a color tone(s) adapted to make visible a hidden image provided in the first communication card 2.

With and after such steps, it is now possible for the image transmission server 31 of the information processing system 3 to transmit an image output data on how to use the first communication card 2, or an information data on the color tone(s) adapted to make visible the hidden image in the first communication card 2, to the user.

Next, the information sender distributes the first communication card 2 to the user (see the designation h in FIG. 1).

The user, for example, inputs the URLs 24 and 25, which appear on the first communication card 2, into a browser in his or her terminal device 51, then gains access to the image transmission server 31 of the information processing system 3, and causes an information input image data and a data on how to use the first communication card 2 to download to the terminal device 51. As a result thereof, from the user's terminal device 51, an image and/or a sound is/are generated to indicate how the first communication card 2 is to be used, and at the same time, an information input image is indicated on the display means of the terminal device.

Then, the user can view the image appearing on the display of the terminal device 51 and understand how to use the first communication card 2.

Also, the user can operate the input means of the terminal device 51 to write required items in an input window image which is indicated on the display according to the information input image data, so that the corresponding information data is sent to the received information processing means 33 of the first information processing system 3. As a result thereof, the received information processing means 33 outputs an instruction signal to the image transmission server 31 which in turn transmits an image output data to the user's terminal device 51 forming one element of the image display/recognition system 5, wherein the image output data is designed to make visible the hidden image plotted in the optical medium 23 of the first communication card 2.

Responsive thereto, the display means (hereinafter, referred to as "display") of the user's terminal device 51 indicates images in a color tone(s) capable of making visible the hidden image in the optical medium 23 of the first communication card 2.

Then, the user brings the optical medium portion 23 of the fist communication card 2 to contact upon the display of the user's terminal device 51, whereupon the hidden image in the optical medium 23 of the first communication card 2 is set in a complementary color relation with the color tone(s) emitted on and from the display of the foregoing user's terminal unit 51, thereby making the hidden image clearly visible. Thus, the user can visually recognize the hidden image defined in the optical medium 23 of the first communication card 2. In that way, the hidden image in the optical medium 23 of first communication card 2 is now made visible clearly, so that, for example, the hidden image becomes visible as the following literal image: "You win".

At this point, with regard to the information data of the check bit number 22 printed on the sheet 21 of the first communication card 2, the user transmits such information to the received information processing means 33 of the information processing system 3 via his or her terminal device 51. Simultaneous therewith, besides that information data on check bit number 22, it is to be understood that an inputted information data, a serial number of the terminal device, a customer's ID, and the like are transmitted to the received processing means 33 from the user's terminal device 51.

Upon receiving the thus-transmitted information data of the check bit number 22 of first communication card 2, the foregoing received information processing means 33 of first information processing system 3 executes a required processing, such as a processing for lottery, based on that particular information data of check bit number 22. During this processing step, it is arranged such that, if an information data identical to that of the check bit number 22 is transmitted twice, the received information processing means 33 of information processing system 3 will refuse to receive the information data. Thereafter, the received information processing means 33 of information processing system 3 again transmits a result of processing finalized thereby, such as a result of the aforesaid lottery, to the user's terminal device 51.

Then, when receiving the information from the received information processing means 33, the terminal unit 51 indicates it on the display thereof, whereby the user can, for example, notice his or her wining in a quiz, or obtain an information on a desired goods.

It is noted that the received information processing means 33 of the first information processing system 3 is capable of processing an information based on the check bit number 22 of the first communication card 2, and/or any pertinent information through a serial number of terminal device, a customer ID and the like. For example, such information processing effected by the received information processing means 33 deals with an information concerning a customer management and a trend of customers' preference, and any other information associated with customers.

According to the above-described basic concept of the first inventive aspect of the present invention, it is to be appreciated that the hidden image defined in the optical medium 23 of the first communication card 2 can be perceived visually only in the presence of a particular color tone matched therewith, hence providing a high confidentiality of an information to be hidden in secrecy.

Further, according to the basic concept of the first inventive aspect, it is possible for a sender of image information data to properly set a relation between the hidden image provided on the optical medium 23 and the image output data in a desired manner, hence providing a high confidentiality of an information to be hidden in secrecy.

Additionally, according to the foregoing embodiment of the first inventive aspect, it is possible to effectively make visible an image to be hidden in secrecy.

[A Basic Concept of Second Inventive Aspect]

FIGS. 3 to 6 are intended to illustrate a communication card system in accordance with the basic concept of second inventive aspect of the present invention. The term, "the second inventive aspect", in this case refers to a system capable of processing a main image data received in the user's terminal device and causing it to indicate on the afore-stated display means, while simultaneously processing a data of hidden image and causing it to indicate on that display means in an invisible state, and further allowing the hidden image appearing on the display means to be visually perceivable by means of the afore-stated second communication card, so that a certain information can be provided to customers through use of the communication card.

Figure 3:
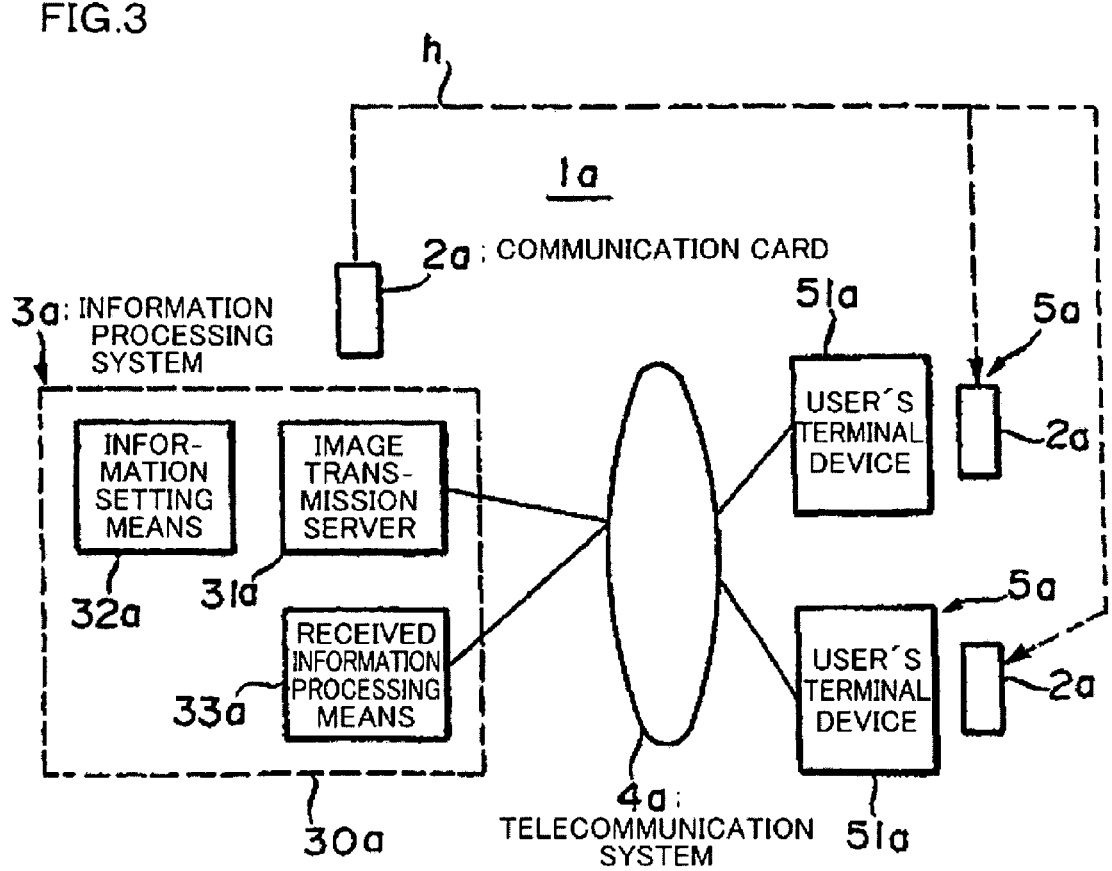
FIG. 3 is a block diagram illustrative of a network communication system in accordance with an embodiment of a second inventive aspect of the present invention.

FIG. 3 is a block diagram illustrative of the communication card system in accordance with the present basic concept of the second inventive aspect.

In the FIG. 3, generically stated, the communication card system 1*a* in accordance with the base of the second inventive aspect is comprised of: a second communication card 2*a*; a second information processing system 3*a*; a plurality of image display/recognition systems 5*a*, 5*a*, . . . which are workable to recognize a displayed image. The afore-said first information processing system 3 may be connected with each of the image display/recognition systems, 5*a*, 5*a*, . . . through a telecommunication system 4 capable of wireless communication including an Internet.

The afore-stated second communication card 2*a* is defined hereby to be a card which is to be provided and distributed by an information sender to a user. It should be understood that the FIG. 3 shows the state where the information sender distributes the communication card 2*a* to the user, as indicated by the chain lines designated by a reference character h.

On the surface of the foregoing second communication card 2*a*, there may be, for example, printed a URL, a check bit number (lucky number), and a predetermined mark(s) including a letter(s), a graphic(s), and a sign(s). The check bit number indicated or printed on the second communication card 2*a* are arranged differently per communication card 2*a* such that a plurality of the cards 2*a* differ in contents from one another. In this context, for example, the second information system 3*a* may be comprised of: an image transmission server 31*a*; an information setting means 32*a* for inputting and setting information in the said image transmission server 31*a*; and a received information processing means 33*a*.

The foregoing image transmission server 31*a* of the second information processing system 3*a* is not only capable of combining a hidden image data, which is designed for particular communication purpose, with a main image data designed to be normally displayed, but also capable of transmission of an image output data which is designed to cause only the main image data to display in a visible manner, while causing the hidden image to display in an invisible manner.

The foregoing information setting means 32*a* of the second information processing system 3*a* allows the following data to input thereinto; namely, a data concerning drawings, description and sound which are designed to explain how to use the optical medium of the above-stated second communication card 2*a*; and/or an information about the afore-said hidden image data designed for particular communication purpose, and therefore, after those data and information are inputted, the information setting means 32*a* operates to allow the inputted data and information to be transferred to the image transmission server 31*a*.

The received information processing means 33*a* of the second information processing system 3*a* is not only operable in the same way as the operation of the aforementioned received information processing means 33*a* of the first information processing system 3, but also capable of processing an information data based on the check bit number of the second communication card 2*a*, and/or any pertinent information data through a serial number of terminal device, a customer ID and the like. For example, such information processing effected by the received information processing means 33*a* deals with an information concerning a customer management and a trend of customers' preference, and any other information associated with customers.

As shown in FIG. 3, the image display/recognition system 5*a* is provided with user's terminal devices 51*a* which are each own by a user and operable to display an invisible hidden image on the basis of a data of the hidden image and also display a main image on the basis of a data of the main image, with such an arrangement that, when a second communication card 2*a* distributed from the foregoing information sender is placed on or over the screen of the user's terminal device 51*a*, the hidden image can be made visible clearly. It is noted here that the optical medium of the second communication card 2*a* is formed from a medium having an optically transmissive property which can establish a complementary color relation with a color(s) of hidden image to be displayed on the basis of a data of the hidden image, or establish a complementary color relation with a background color(s).

The user's terminal unit device 51a may be any suitable device having a display device capable of displaying the hidden image and primary image, and an input means, such a keyboard, which allows for inputting of a desired information.

Also, another exemplary mode of such user's terminal unit 51a may be a personal computer not to mention, but, it may be one of other various kinds of computers capable of connection with the above-stated telecommunication system 4a.

In the present embodiment, the foregoing user's terminal device 51a may be a mobile terminal or cellular phone, and in that case, the image transmission server 31a is equivalent to an information transmission server of the type used by an electric communication business entity. Further, the user's terminal device 51a may be an online karaoke device capable of two-way transmission, a CATV receiver capable of two-way communication, or the like, in which case, the image transmission server 31a may be a transmitter typically provided in a transmitting station.

Figure 4:
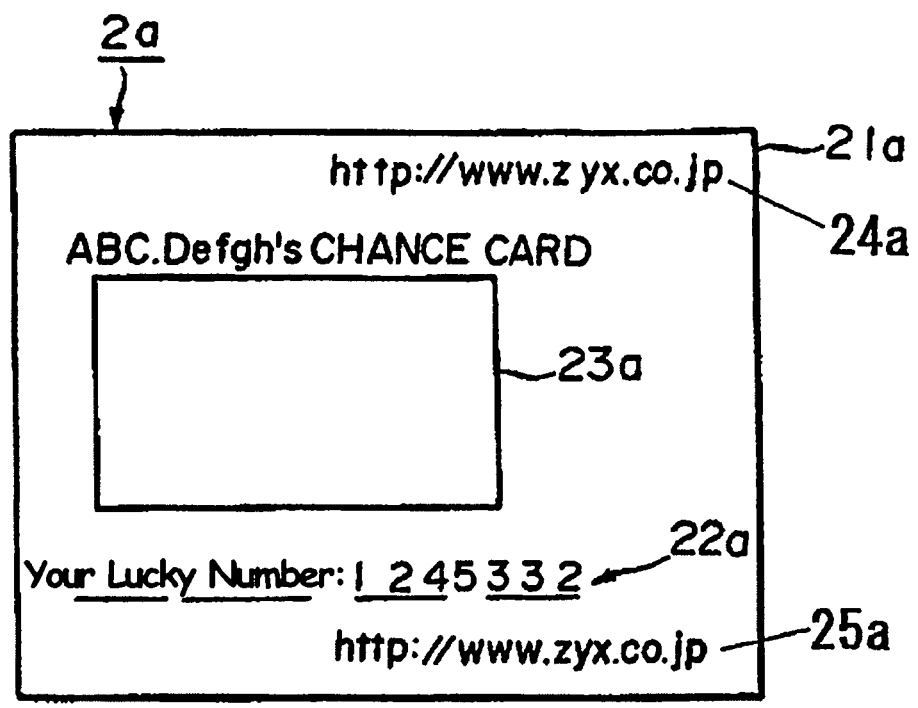
FIG. 4 is a plan view showing a makeup or formation of a piece for use with the network communication system in accordance with the embodiment of the second inventive aspect of the present invention.

FIG. 4 is a plan view showing a makeup or formation of a communication card to be used in the communication card system in accordance with the basic concept of the second inventive aspect of the present invention.

As shown in the FIG. 4, the second communication card 2a may be a sheet 21a formed from a thin flat base material which is for example such a thin-plate-like substrate as paper, plastics, transparent film, or acrylic thin plate, wherein the sheet 21a has, provided in its localized area, an optical medium 23a of a predetermined square measure. On the surface of that sheet 21a of this second communication card 2a, as in FIG. 4, a mark(s) may be printed as required (e.g. a check bit number 22a, URLs 24a, 25a, a name of the card, a logo, and the like).

The optical medium 23a, provided in the localized area of the second communication card 2a, is formed by a light transmissive medium having an optically transmissive property which can establish a complementary color relation with a color(s) of hidden image to be displayed on the basis of a data of the hidden image, or with a background color. Specifically, the optical medium 23a may be a medium essentially formed by a thin flat substrate and a light-transmissive paint coating the substrate, wherein the thin flat substrate is the previously stated material such as paper, plastics, transparent film, and acrylic thin plate and wherein the light-transmissive paint having a color(s) that can establish a complementary color relation with a color(s) of the hidden image.

Figure 5:
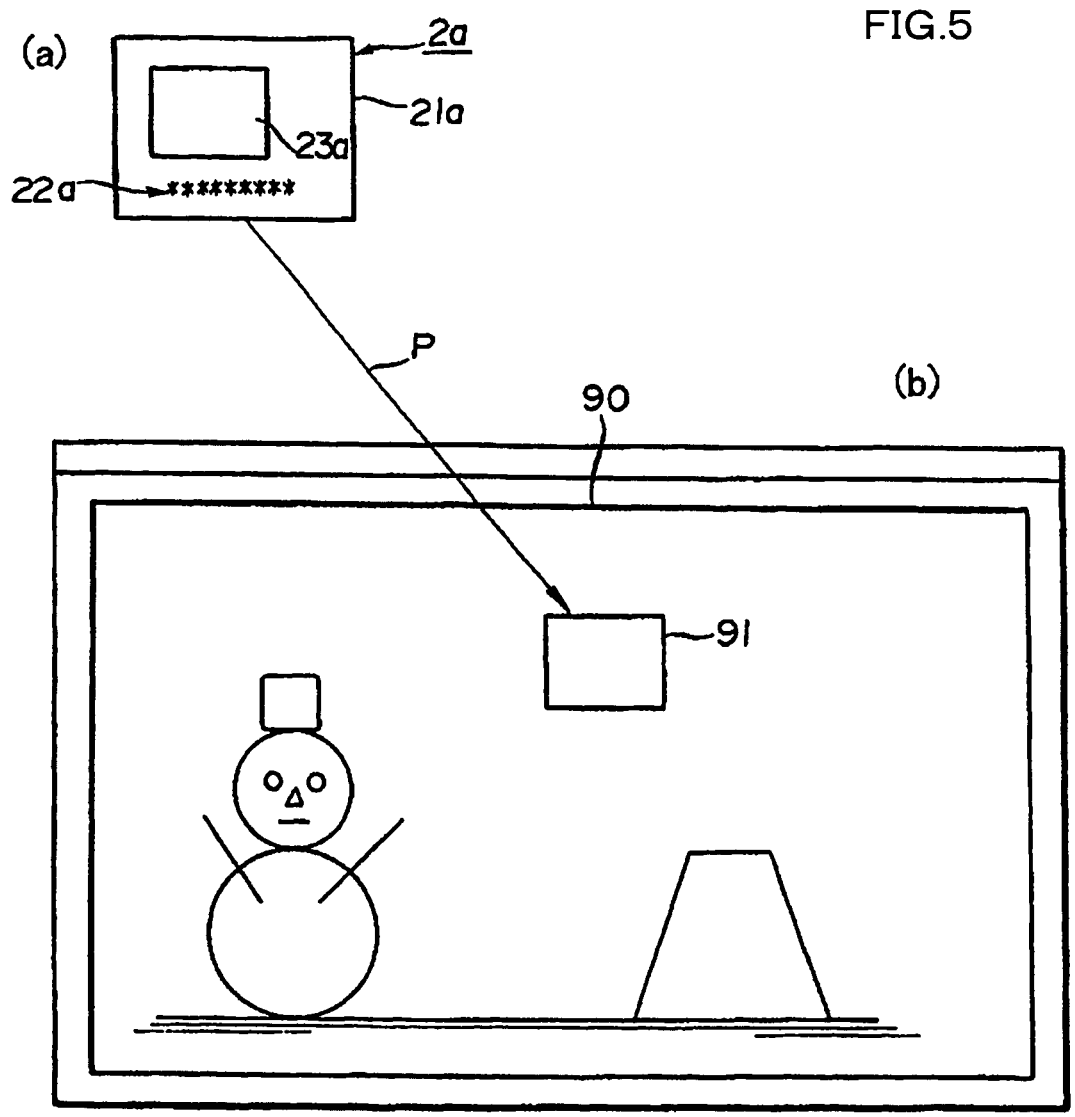
FIG. 5 is an explanatory diagram showing an example of composite image indicated on a display device of an image display/recognition system on the basis of a composite image data transmitted from a hidden image transmission system, in accordance with the embodiment of the second inventive aspect of the present invention.

Now, referring to FIGS. 5 and 6 in conjunction with FIGS. 3 and 4 a description will be made of the communication card system in accordance with the basic concept of the second inventive aspect and of operation of the second information processing system and image display/recognition system which are used in the said communication card system.

In the present embodiment, FIG. 5(a) is a diagram showing the second communication card to be used in the second information processing system in accordance with the basic concept of the second inventive aspect. FIG. 5(b) is a diagram for explanatorily showing an example of a composite image which is indicated on the display of the image display/recognition system on the basis of a composite image data transmitted from the second information processing system in accordance with the basic concept of the second inventive aspect. FIG. 6 is a diagram for explanatorily showing the state where the hidden image in the composite image indicated on the display is made visible as a result of placing the second communication card on and over the display of the image display/recognition system in accordance with the basic concept of the second inventive aspect.

Now, what should be first done on the side of the information sender is to prepare the second communication card 2a in accordance with a predetermined processing process with respect to the details of communication to be conveyed.

Then, further, on the information sender's side, an information data on how to use the second communication card 2a and an information data of the hidden image are inputted into the image transmission server 31a via the foregoing information setting means 32a.

The information sender distributes the second communication card 2a to a user (see the designation h in FIG. 3).

The user inputs the second communication card 2a into a browser in each of user's terminal devices 51a, then operates the terminal device 51a to establish connection with the image transmission server 31a of the second information processing system 3a, and obtains an image data on how to use the second communication card 2a and an information input image data. Hence, upon an image being indicated on the display of the user's terminal device 51a and upon a sound being emitted from a speaker of the terminal device, for example, the user can understand how the second communication card 2a is to be used.

Thereafter, the user operates the input means to input required information into the information input image indicated on the display of the user's terminal device 51a, and then clicks on a send button given in that image. Responsive thereto, the user's terminal device 51a transmits to the received information processing means 33a a collected data which has been collected from the foregoing information input image. After having loaded such collected data, the received information processing means 33a gives an instruction to the image transmission server 31a, which in turn causes the image transmission server 31a to transmit an image output data to the user's terminal device 51a.

In that way, the user's terminal device 51a obtains the image output data form the image transmission server 31a, wherein the image output data is a composite image data created by combining the hidden image data with the main image data.

Accordingly, in operation, as shown in FIG. 5(b), a main image 90 appears on the display of the terminal device 51a according to the main image data in the composite image data. Actually, in the main image data 90, a hidden image 91 hidden by that main image 90 is indicated on the display as shown in the FIG. 5(b), but apparently remains invisible at this point.

Then, as indicated by the designation P extending from FIG. 5(a) to FIG. 5(b), the user takes the second communication card 2a that has been distributed to him or her, and brings the optical medium 23a of that card 2a to contact upon a particular area of the foregoing main image 90 which corresponds to the hidden image 91. As a result thereof, as shown in FIG. 6, an information intended for particular communication purpose becomes visible as a visualized image 92 in such particular area on which the optical medium 23a is contacted, upon the display of the user's terminal unit 51a of the image display/recognition system 5a.

Figure 6:
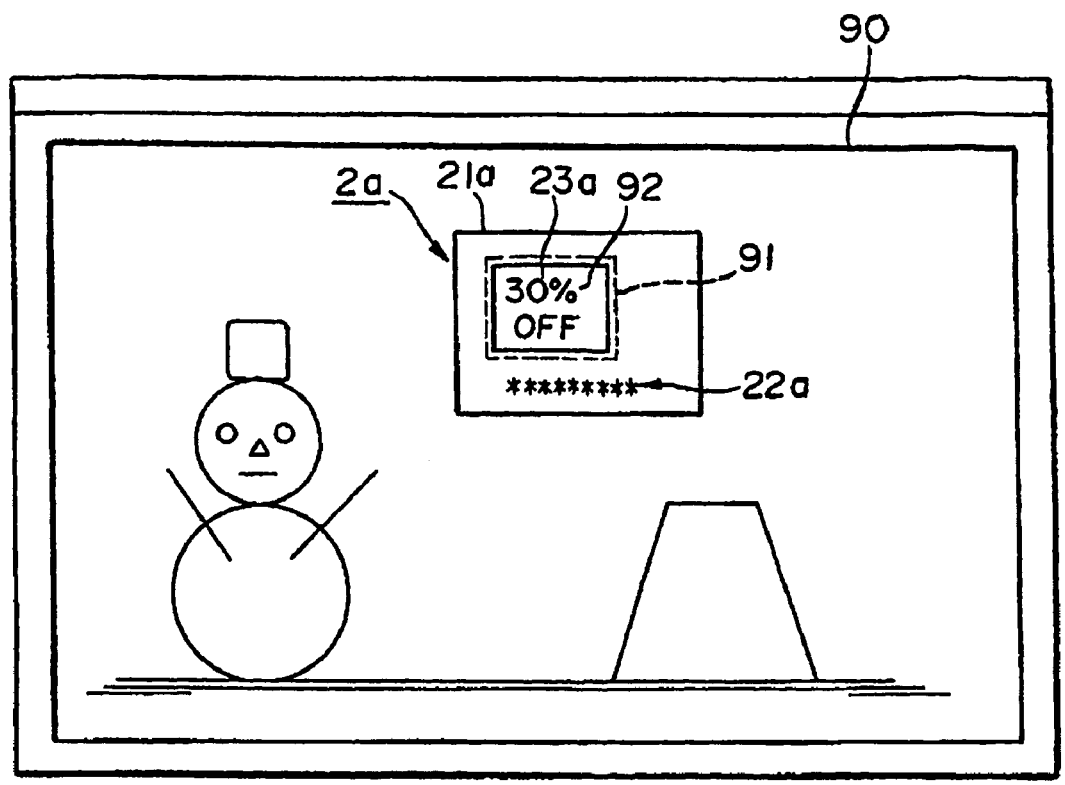
FIG. 6 is an explanatory diagram showing the state where a composite image transmitted from a hidden image transmission system of the embodiment of the second inventive aspect is indicated on the display device of an image display/recognition system, and a hidden image is made visible clearly in such composite image.

As far as the present basic concept of the second inventive aspect is concerned, as shown in the FIG. 6, the visualized image 92 can appear on the display in the form of the following letters: "30% OFF", by way of example. The reason for realizing such visualization is based on the arrangement wherein the color(s) of those letters corresponding to the hidden image 91 in the main image 90 shown in FIG. 6 is maintained in a complementary color relation with the color(s) of the optical medium 23a of the second communication card 2a, thereby, for instance, rendering the letters themselves visible in black.

Accordingly, with the foregoing second communication card 2a, it is possible to make the user visually perceive an information intended for particular communication purpose which is indicated on the display of the user's terminal device 51a.

Then, the user transmits the check bit number 22a of the second communication card 2a from his or her terminal device 51a to the received information processing means 33a of the second information processing system 3a.

Such check bit number 22a of the second communication card 2a is now subjected to processing in the received information processing means 33a, as by a lottery processing for example. From the received information processing means 33a, a result of such processing is transmitted to the user' terminal device 51a via the telecommunication system 4a.

Thus, for example, the user, who receives a response from the received information processing means 33a, which is indicated on the display of the user's terminal device 51a, can notice a wining in quiz or can obtain an information on a desired goods.

At this point, it is essential that the check bit number 22a, a serial number of the terminal device, a customer ID, and the like, should be transmitted to the user's terminal device 51a. With such arrangement, if an information identical to that of the check bit number 22a of the second communication card 2a is transmitted twice, the received information processing means 33a will refuse to receive such duplicate information.

Further, the foregoing received information processing means 33a is capable of processing various kinds of information on the basis of the check bit number, serial number of terminal unit, customer ID, and the like. For example, such information processing effected by the received information processing means 33a deals with an information concerning a customer management and a trend of customers' preference, and any other information associated with customers.

As described above, in accordance with the present basic concept of the second inventive aspect, the second information processing system 3a operates to process any information intended for particular communication purpose into a hidden image data and combine or incorporate that hidden image data with or in a main image data so as to create a composite image data, after which, the second information processing system 3a transmits such composite image data to each of the image display/recognition systems 5a, 5a, . . . . On the side of the users, a main image 90 is indicated on the display of each user's terminal device 51a, and also an information intended for particular communication purpose is indicated as a hidden image in that main image 90. The hidden image is made visible by the optical medium 23 of the second communication card 2a, so that a desired particular communication data can be provided to the user.

In accordance with the above-described basic concept of the second inventive aspect, it is to be appreciated that any information is not described in the optical medium 23a of the second communication card 2a, and that a communication data can be perceived visually only in the presence of a hidden image 91 indicated on the display of the user's terminal device 51a, hence attaining a high confidentiality of any information desired to be hidden in secrecy.

Further, in accordance with the present basic concept of the second inventive aspect, the hidden image data can be created on the side of the second information processing system 3a in any desired manner, which is effective and advantageous for providing a high freedom that allows for any change of the hidden image intended for particular communication purpose.

Still further, in accordance with the basic concept of the second inventive aspect, it is possible to display any moving image as a hidden image, if desired.

Additionally, in accordance with the basic concept of the second inventive aspect, it is possible to effectively allow any desired hidden image to be visually perceivable.

[Exemplary Modified Embodiment of the Basic Concept of the Second Inventive Aspect]

FIGS. 7 to 10 are intended to illustrate an exemplary modified embodiment of the above-described basic concept of the second inventive aspect of the present invention in regard to the communication card system by way of example. It is noted here that the term, "exemplary modified embodiment", in this case refers to a system capable of making visible a hidden image indicated on the display of image display/recognition system by means of the communication card 2b having, provided at a particular position therein, an optical medium of optically transmissive property, as well as by means of the image display/recognition system for displaying the hidden image at a position corresponding to such particular position in the communication card.

Figure 7:
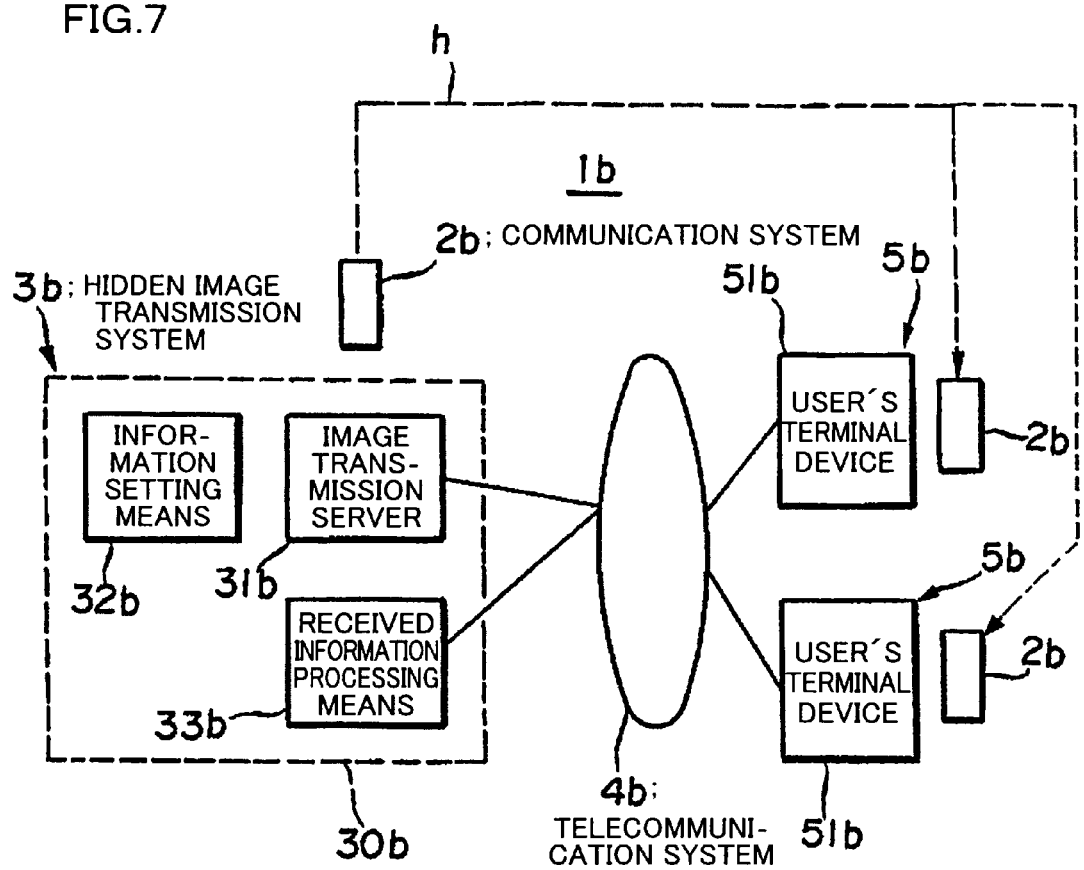
FIG. 7 is a block diagram illustrative of a network communication system in accordance with an embodiment of a third inventive aspect of the present invention.

FIG. 7 is a block diagram illustrative of a communication card system in accordance with the present exemplary modified embodiment of the basic concept of the second inventive aspect.

In the FIG. 7, generically stated, the communication card system 1b, in the present exemplary modified embodiment of the basic concept of the second inventive aspect, is comprised of: a communication card 2b; a hidden image transmission system 3b; and an image display recognition systems 5b, 5b, . . . . The hidden image transmission system 3b is connected with each of the image display/recognition systems 5b, 5b, . . . via a telecommunication system 4b capable of wireless communication including an Internet.

As shown in FIG. 7, the foregoing hidden image transmission system 3b is comprised of: an image transmission server 31b; an information setting means 32b; and a received information processing means 33b. The image transmission server 31b may be the same image transmission server used in the previously described basic concept of the second inventive aspect, for example. The communication card 2b is formed by a flat card having, provided on a localized area thereof, an optical medium of an optically transmissive property which can make a hidden image visually perceivable to the eyes of a person who looks thereat. This optical medium of the communication card 2b is formed by a medium with an optically transmissive property, which has a light transmissive portion disposed therein at a location corresponding to a display point where the hidden image is formed and indicated on the basis of a hidden image data.

Further, as shown in FIG. 7, the foregoing image display/recognition system 5b, which may be owned by a user or may be in a condition operable by the user, is provided with user's terminal devices 51b which are each capable of indicating a main image on the basis of a main image data and also indicating a hidden image on the basis of a hidden image data that can not be outputted in any visible manner, with such an arrangement that, when the communication card 2b, which has the optical medium of an optically transmissive property that can convert such data of invisible hidden image displayed on the user's terminal device 51b into a data of visually perceivable image, is placed on or over an image being indicated on the display of the user's terminal device 51b, a hidden image therein is made visible clearly.

It is noted that a structural relation between that particular user's terminal device 51b and the hidden image transmission system 3b is identical to that described in the foregoing first embodiment or the foregoing second embodiment.

Figure 8:
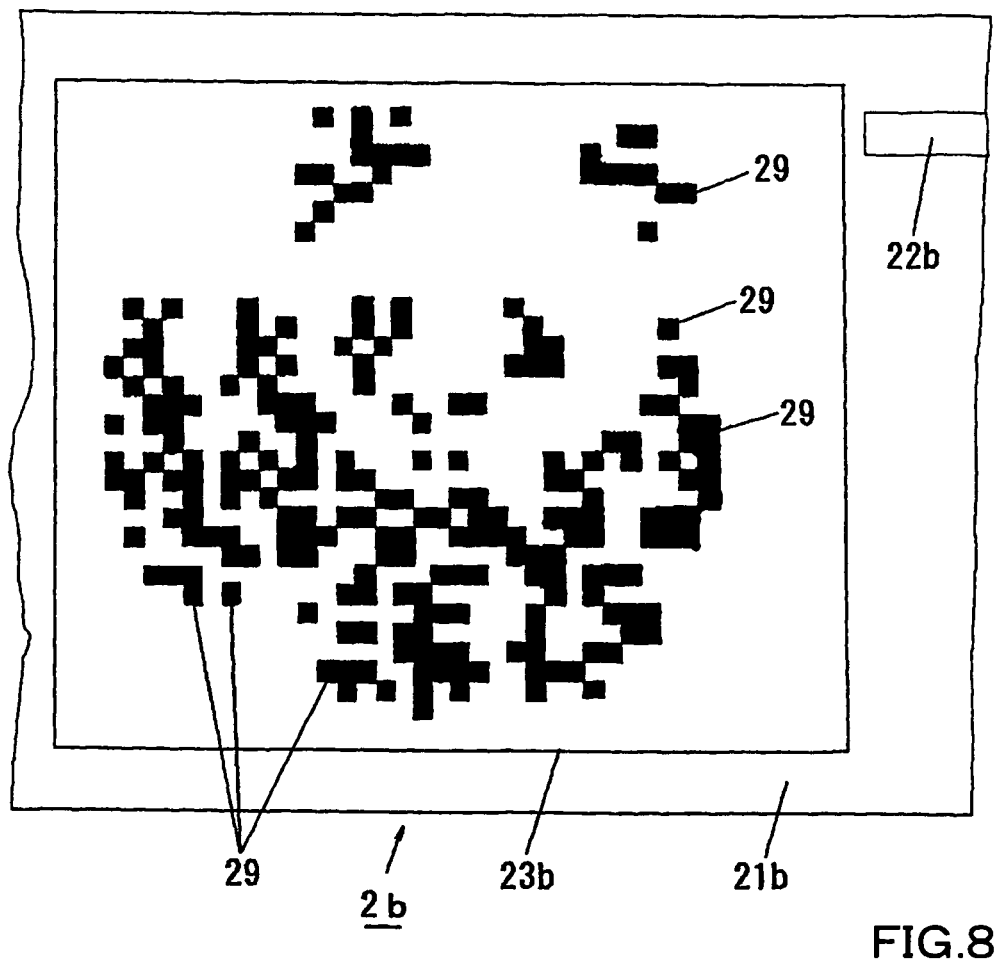
FIG. 8 is a plan view showing a makeup or formation of a piece for use with the network communication system in accordance with the embodiment of the third inventive aspect of the present invention.

FIG. 8 is a plan view showing the makeup or formation of communication card to be used in the communication card system in accordance with the present modified embodiment of the basic concept of the second inventive aspect.

This communication card 2b, as shown in the FIG. 8, comprises a sheet 21b formed by a thin flat substrate, such as plastics, and an optical medium 23b disposed on a localized region of such sheet, the optical medium 23b having a predetermined square measure. While not shown, on the surface of that first communication card 2b or the sheet 21b, there may be printed an imagery and/or letter(s) as required, in which case, likewise as in the first or second embodiment, it is desirable that a certain mark(s)(a check bit number 22b, URLs 24, 25, and/or other information) be printed on the surface of the sheet 21b.

The optical medium 23b, provided on one localized region of the foregoing communication card 2b, is formed from a medium having an optically transmissive property, which has a light transmissive portion disposed therein at a location that can correspond with a point of display where a hidden image is to be formed and displayed on the basis of a hidden image data. Specifically, the optical medium 23b may comprise: the afore-stated thin-plate sheet 21b which is formed from an opaque film or opaque thin acrylic plate, or a transparent film or transparent thin acryl plate; an impermeable coating material applied on an entire surface of the sheet 21b; and a plurality of holes 29, 29, . . . each having a dimensions of about 0.1 to 5.0 [mm], which are formed in the sheet 21b at a location that can correspond with a point of display where a hidden image is to be formed and displayed on the basis of a hidden image data. (Those holes 29, 29, . . . are indicated in black dots in FIG. 8). It is noted that, in addition to the thus-formed holes 29, 29, . . . , some dummy holes may be formed in the optical medium 23b insofar as they will not prevent recognition of the hidden image, in order to increase the confidentiality of information.

The above is a description dedicated to the case where the holes 29, 29, . . . are formed in the optical medium 23b, but, particularly as regards such thin-plate sheet 21b which for example comprises a transparent film or transparent acrylic plate and a light-impermeable coating material applied on the entire surface of that film or plate, such coating material may be removed at points corresponding to the respective holes 29, 29, . . . so as to define a plurality of light transmissive points in the sheet 21b, in place of those holes.

Now, referring to FIGS. 9 and 10 in conjunction with FIGS. 7 and 8, a description will be made of operations of the communication card system, the hidden image transmission system and the image display/recognition system in accordance with the above-described modified mode of the basis of the second inventive aspect.

Figure 9:
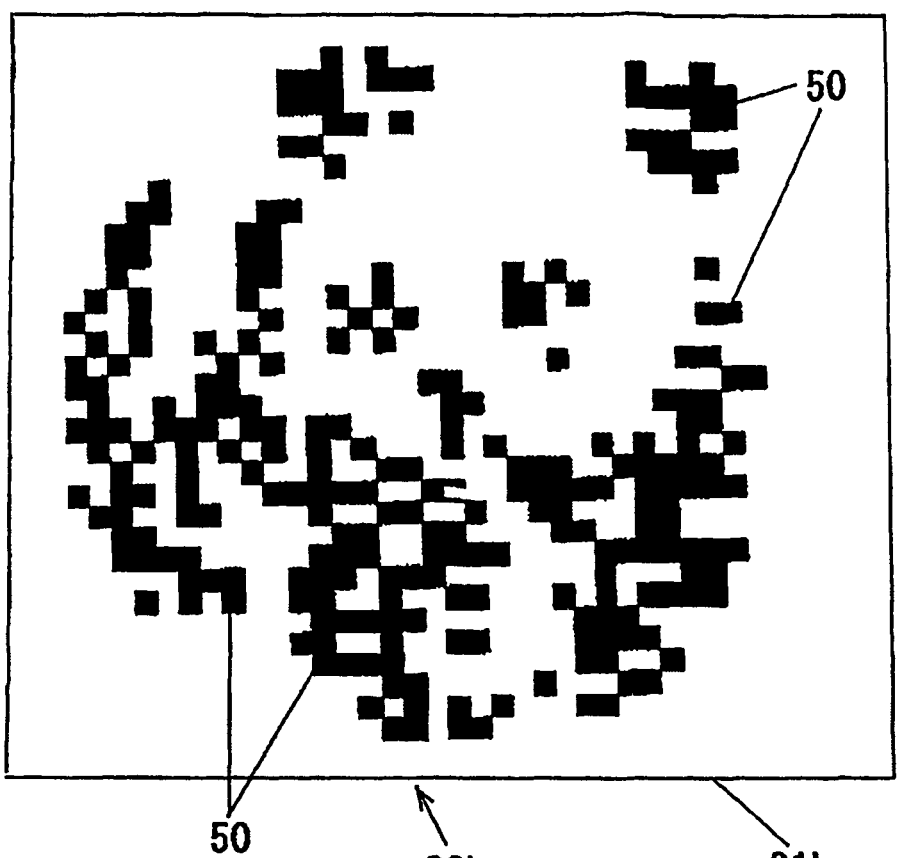
FIG. 9 is an enlarged view for explanatorily showing the state where one example of composite image transmitted from a hidden image transmission system of the embodiment of the third inventive aspect is indicated on the display device of an image display/recognition system.
Figure 10:
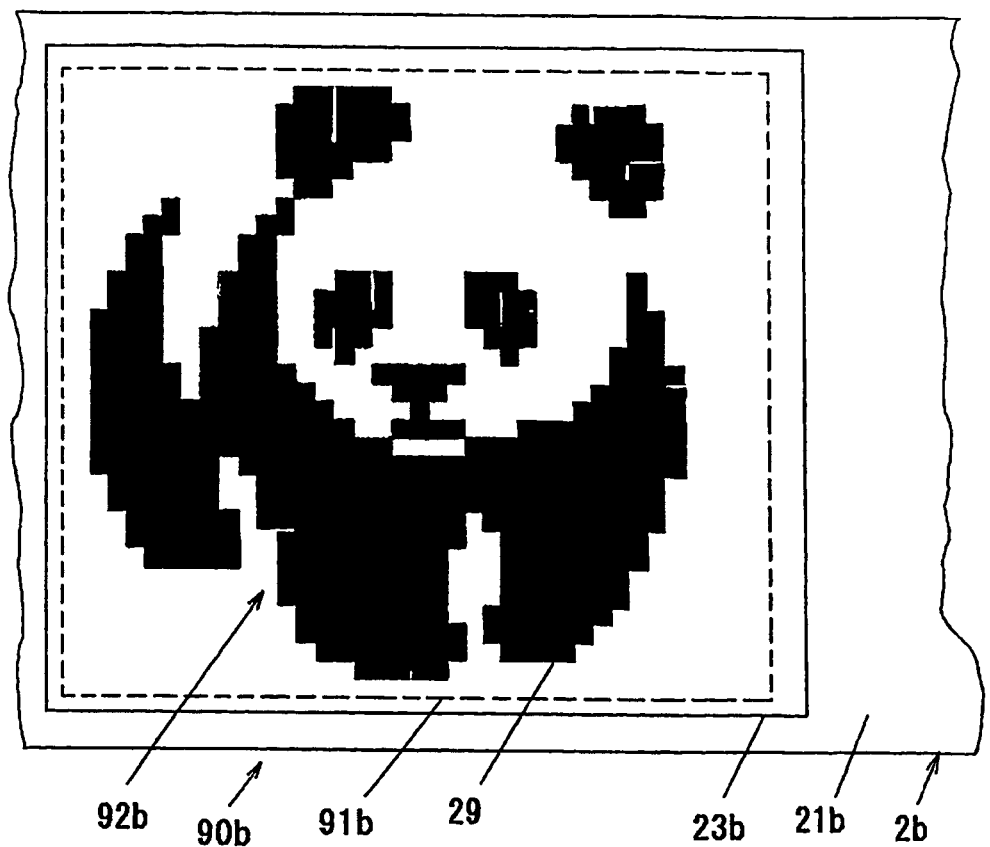
FIG. 10 is an enlarged view for explanatorily showing the state where a composite image transmitted from a hidden image transmission system of the embodiment of the third inventive aspect is indicated on the display device of image display/recognition system, and a hidden image is made visible clearly in such composite image.

In the present embodiment, FIG. 9 is an explanatory diagram providing an enlarged view of an exemplary composite image which is indicated on the display of the image display/ recognition system on the basis of a composite image data transmitted from the hidden image transmission system in accordance with the present modified mode of the basic concept of the second inventive aspect. FIG. 10 is an explanatory diagram providing an enlarged view of the state where the hidden image is made visible in the composite image indicated on the display of the image display/recognition system on the basis of a composite image data transmitted from the hidden image transmission system in accordance with the present modified mode of the basic concept of the second inventive aspect.

First of all, the information sender prepares a communication card(s) 2b, based on what desired to be done as a predetermined communication services, in accordance with predetermined processing steps.

Next, the information sender inputs an information data on how to use the communication card 2b and an information data on a hidden image into the image transmission server 31b via the foregoing information setting means 32b.

The information sender distributes the communication card 2b to a user (see the designation h in FIG. 7).

The user inputs a URL of the information sender into a browser of his or her terminal device 51b, and establishes connection of the terminal device 51b with the image transmission server 31b of the hidden image transmission system 3b, so that a data of information input image is downloaded to the terminal device, and also, a data concerning how to use the first communication card 2b is downloaded thereto. Then, upon an image being indicated on the display of the terminal device 51b and upon a sound being emitted from the speaker of the terminal device 51b, the user can understand how to use the first communication card 2b. When the user has inputted a required data in the information input image indicated on the display, the user's terminal device 51b transmits the inputted data to the received information processing means 33b. Upon receipt of such collected information, the received information processing means 33b gives an transmission instruction to the image transmission server 31b, requesting transmission of an image output data.

Thereafter, the image transmission server 31b, upon receiving such transmission instruction, operates to contact the user's terminal device 51b, requesting that an image output data be outputted and transmitted from the image transmission server 31b to the user's terminal device 51b.

As a result, in the user's terminal device 51b, the image output data is obtained, which contains a composite image data that the image transmission server 31b has created by combining a given hidden image data with a main image data. Thus, as shown in FIG. 9, upon the display of the user's terminal device, a certain main image 90b is indicated on the basis of the main image data incorporated in the composite image data. In the thus-indicated main image 90b, a hidden image 91b is indicated, which is actually formed by a plurality of light emitting points 50, 50, . . . at predetermined positions, while being concealed or hidden by the indicated main image 90b. (In FIG. 9, such light emitting points 50, 50, . . . are however indicated in back.) It is noted here that the light emitting points 50, 50, . . . themselves are normally indicated in an invisible manner unless otherwise processed.

Then, the user takes the communication card 2b that has been distributed from the information sender and brings a particular area of that card 2b, which corresponds to the optical medium 23b, into contact upon a localized region of the indicated main image which corresponds to the hidden image 91b, whereupon, as seen in FIG. 9, an information intended for particular communication purpose becomes visualized as a clearly visible image 92b.

In accordance with the present modified embodiment of the basic concept of the second inventive aspect, as illustrated, the visible image 92b is a "picture of panda", for instance. The reason for such visualization of the image 92b is based on the arrangement wherein the position of the light emitting points (indicated in black by the designations 50, 50, . . . in FIG. 9) at the hidden image 91b of the main image shown in FIG. 10 is maintained in a predetermined relation with the position of the holes 29, 29 . . . , whereby the "picture of panda" becomes visualized in the form of black panda figure.

Accordingly, by use of the communication card 2b as above, an information intended for particular communication purpose, which is indicated on the display of the user's terminal device 51b, can be made visually perceivable to the user.

On the basis of such visually perceived information, the user can obtain a particular desired information. Hence, relying on that information, the user operates his or her terminal device 51b so as to transmit the check bit number printed on the afore-said communication card 2b to the received information processing means 33b of the hidden-image transmission system 3b through the telecommunication system 4b, so that the user can receive and enjoy an appropriate service. In this regard, it is to be noted that, if one and the same check bit number of the communication card 2b is transmitted twice, the received information processing means 33b will refuse to receive such duplicate information data, as similar to the above-described basic concept of the first inventive aspect as well as the above-described basic concept of the second inventive aspect.

It is also noted that a processing of customers' information by the foregoing received information processing means 33b may be executed in substantially the same manner as in the previously described basic concept of the first inventive aspect and the previously described basic concept of the second inventive aspect.

As described above, in accordance with the present modified embodiment of the basic concept of second inventive aspect, the information processing system 3b operates to process any information intended for communication purpose into a hidden image data and combine that hidden image data with a main image data so as to create a composite image data, after which, the information processing system 3b transmits such composite image data to each of the image display/recognition systems 5b, 5b, . . . . On the side of the users, a main image is indicated on the display of the user's terminal unit 51b, and also an information intended for particular communication purpose is indicated as a hidden image 91b in that main image. The hidden image 91b is made visible by the optical medium 23b of the foregoing communication card 2b, so that a desired communication data can be imparted to the user.

In accordance with the above-described modified mode of the basic concept of the second inventive aspect, it is to be appreciated that the following advantages are attainable as similar to the previously described basic concept of the first inventive aspect and the previously described basic concept of the second inventive aspect.

(1) Any information is not described in the optical medium 23b of the communication card 2b, and that a communication data can be perceived visually only in the presence of a hidden image 91b indicated on the display of the user's terminal unit 51b, hence providing a high confidentiality of an information to be hidden in secrecy.

(2) The hidden image data can be created on the side of the hidden image transmission system in any desired manner, which is advantageous in terms of providing a high freedom of changes of the hidden image intended for communication.

(3) In accordance with the basic concept of the second inventive aspect, it is possible to display any moving image as a hidden image, if desired.

[Another Basic Concept of the Present Inventive Aspects]

The above description so far has been dedicated to the basic concept of the first inventive aspect, the basic concept of the second inventive aspect, and the modified mode of such basic concept of the second inventive aspect. Now, as another basic concept of those inventive aspects of the present invention, an off-line system may be arranged in the systems and arrangements described above. Namely, in accordance with another basic concept of the foregoing inventive aspects, the hidden image transmission system may be arranged such that an information intended for particular communication purpose is processed as a hidden image data, then, the hidden image data is combined with or incorporated in a main image data so as to create a composite image data, after which, such composite image data is stored in a recording or memory medium, such as video tape, CD-ROM, CD-R, CD-RW, or DVD, and then, the memory medium is delivered to a particular destination where an image display/recognition system is provided, so that the image data stored in the memory medium can be reproduced and displayed by a user's terminal device having an image display/recognition system, and also, a hidden image in the displayed image can be made visible by means of a piece that has been distributed to a user, thereby giving an information intended for particular communication purpose to the user.

In that case, in order to receive an information from the user, an electronic mail or an ordinary postal mail may be used.

In the present another embodiment, the hidden image data transmitted from the hidden image transmission system and the piece to be distributed to user may be the same as the hidden image data and the piece used in the previously described first and third embodiments.

Accordingly, the present another embodiment can achieve the same effects and advantages as in the first and third embodiments.

[First Inventive Aspect]

Figure 11:
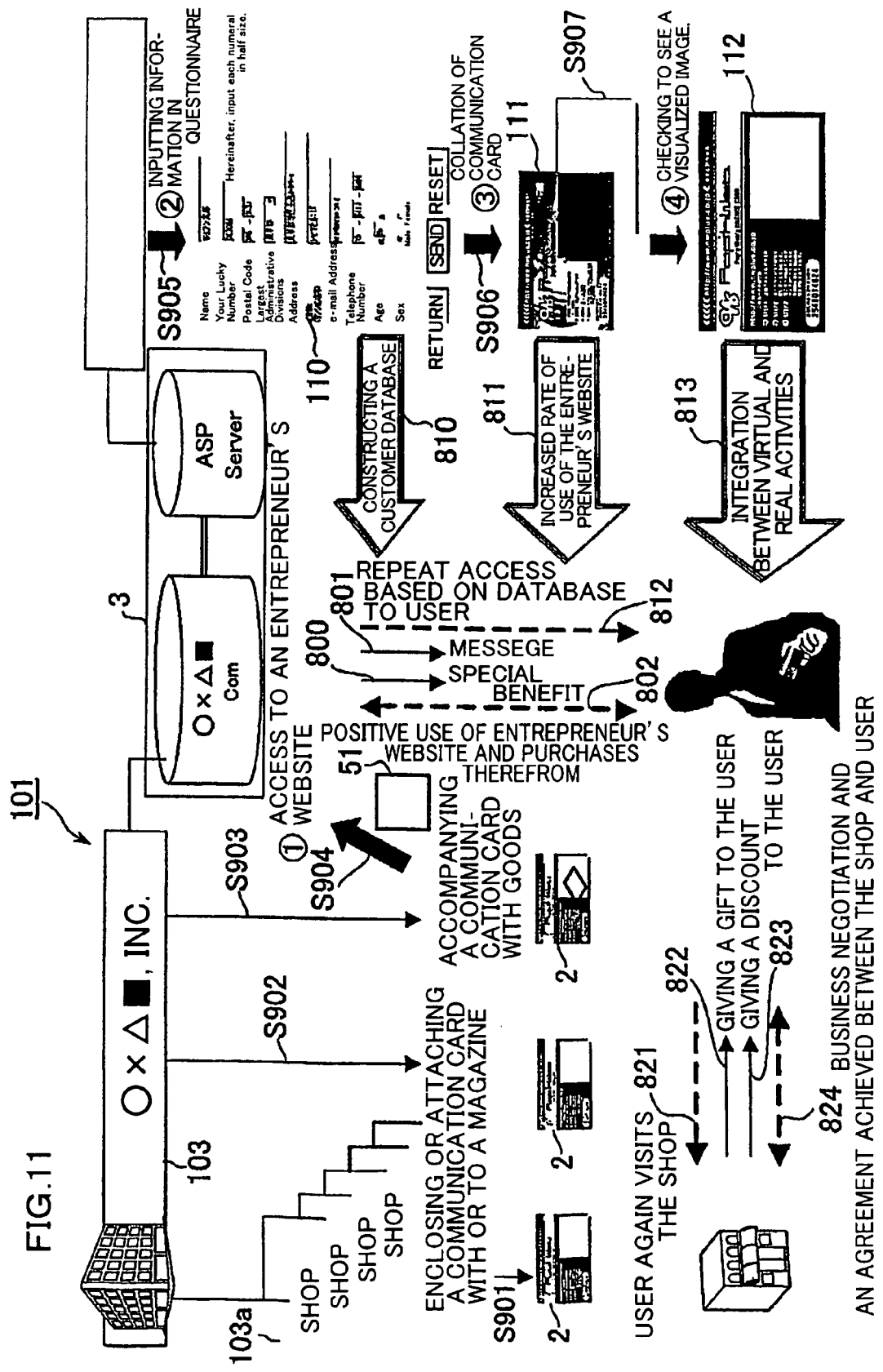
FIG. 11 is a diagram illustrative of a communication card system in accordance with an exemplary embodiment of the first inventive aspect of the present invention.

FIG. 11 is a diagram illustrative of one exemplary mode of communication card system in accordance with the first inventive aspect. In the present mode, the first inventive aspect is hereby defined to refer to a system which is operable in substantially the same way as described previously to cause the display of the user's terminal unit to indicate an image in a predetermined color tone(s), whereby a hidden image in the optical medium of a first communication card is made visually perceivable, so that a given information in the optical medium of the first communication card can be provided to the user. It is noted that, with regard to each of constituent elements of the present first inventive aspect which are identical to those of the previously described basic concept of first inventive aspect, a description will be made thereof along with the same designation as that used in the basic concept of first inventive aspect.

As shown in FIG. 11, a communication card system 101 in accordance with one embodiment of the present first inventive aspect is arrange such that, on the side of an entrepreneur (information sender) 103, there are provided a first communication card 2 on which are printed various pertinent marks (for example, an exclusive lucky number 22 without any other identical number thereto, URLs 24, 25, the name of the card, and so forth), and a first information processing system 3, whereas, on the side of a user, is provided a user's terminal device 51. It is noted that what is described as "communication card system 101" hereinafter may also include any system in which are provided a first communication card 2 bearing various pertinent marks printed thereon (for example, an exclusive lucky number 22 without any other identical number thereto, URLs 24, 25, the name of the card, and so forth), and a first information processing system 3, on the side of an entrepreneur (information sender) 103.

Further, such definition of communication card system 101 may also extend to any arrangement which is only composed of: the first communication card 2 bearing the lucky number 22 and/or the URLs 24, 25 printed thereon; and the first information processing system 3.

In this context, the first communication card 2 which the entrepreneur (information sender) 103 has to prepare may be designed and arranged as shown in FIG. 2, wherein a sheet, on which are printed particular URLs 24, 25 as well as marks 22 including particular letters, graphics and symbols, is provided, in a local area thereof, with an optical medium 23 where a hidden image intended for particular communication purpose is plotted. Also, on other remaining area of the first communication card 2 than the said local area having the optical medium 23, the following phrase may be printed for instance: "Step 1—Access to the above address, Step 2—Access to the homepage, Step 3—Place this chance card on your display monitor, and incredible! you will see the letters "You Win" floating from the card.".

The first information processing system 3, which is used on the side of the entrepreneur (information sender) 103, is capable of transmission of an information input image data, with such an arrangement that, after having transmitted such information input image data, the processing system 3 per se, upon receipt of a collected information written in that information input image data, will effect transmission of an image output data for causing emission of a color tone(s) adapted to make visible a hidden image in the foregoing optical medium, while at the same time, classifying the afore-said collected information in a predetermined way. As described previously, the foregoing first processing system 3 may be owned by the entrepreneur (information sender) 103 or by other party, which does not matter in the present mode. At any rate, the first processing system 3 may be any suitable kind of system insofar as it has the above-described functions and also allows the entrepreneur (information sender) to use the functions.

The user's terminal device 51, which is operated by the user, requires an information input means for allowing input of any desired information data, a display means for displaying an information input image data or any other data to be displayed, and a processing means for executing various required controls and information processing. This user's terminal device 51 may also be owned by the user himself or herself, or be owned by other person. At any rate it may be any suitable terminal unit that enables the user to realize all the pertinent functions described above.

Now, a description will be made of operation of the above-described communication card system. First of all, what is to be done by the entrepreneur (information sender) 103 consists in one of the following steps: a step of distributing the first communication card 2 to users at his or her developing shops 103a, . . . (Step 901), a step of enclosing the card 2 with a magazine and distributing them to users (Step 902), and a step of enclosing the card 2 with a goods and distributing them to the users (Step 903). It is noted here that the distribution of the first communication card 2 is not limited to those three steps, but may for example include one of the following steps: a step of attaching the card 2 to a catalog, a step of sending the card 2 via a direct mail, and a step of attaching the card to a voucher or slip.

Then, each of the users activates a browser in his or her terminal device 51, and inputs into the browser the URLs 24, 25 described in the thus-distributed first communication card 2. As a result thereof, the user's terminal device 51 gains access to the foregoing first information processing system 3 (Step 904), so that a particular information input image data is downloaded from the first information processing system 3 to the user's terminal device 51 and then indicated on the display of the terminal device (Step 905). Thus, as shown in FIG. 11, an information input image 110 appears on the display of the user's terminal device 51.

The user inputs a required information in the information input image indicated on the display through an input means (not shown). After having inputted all required items of information therein, the user clicks on a send button in the information input image, whereupon the information thus collected is transmitted from the user's terminal device 51 to the information processing system 3. It is noted here that, in the present first inventive aspect, the inputting process in the information input image is not confined to the meaning of collecting information only, but it can refer to the act of operating appropriate routines in the image input data, which for example involves inputting information in a questionnaire, obtaining a personal data, obtaining an e-mail address, replying to a quiz, playing a game, operating a pointer with respect to notice of goods, or the like. In any case, the inputting process may be taken to mean all appropriate inputting actions in the information input image. In all descriptions hereinafter, the inputting process should have the same meaning as defined in the foregoing manners.

Upon receiving the foregoing collected information, the first information processing system 3 effects transmission of an image output data (Step 906).

As a result thereof, as shown in FIG. 11, an image 111 is indicated on the display of the foregoing user's terminal device 51 in a color tone(s) based on the foregoing image output data.

Then, the user brings the foregoing first communication card 2 to contact upon the image 111 being indicated on the display (Step 907), whereupon the hidden image in the optical medium 23 of the first communication card 2 is made visible, thus rendering that hidden image visually perceivable to the user (i.e. the image 112 in FIG. 11). In the illustrated mode, it is seen that the hidden image in the optical medium 23 of the first communication card 2 is visualized in the form of the following phrase: "Big Win, Congratulations".

Also, the first information processing system 3 operates to classify and organize the foregoing collected information in a preprogrammed way, and further construct a database on the basis thereof. In this regard, for example, it may be arranged such that, if a user obtains prizes in a lottery, the first information processing system 3 will operate, based on the database, to extract a best data for enabling provision of a most suitable prize or service to the user, and supply such data to the entrepreneur (information sender) 103.

Thus, in accordance with the above-described embodiment of the first invective aspect, the first communication card 2 is given as a communication tool to the user, and by means of such communication tool, the user can not merely obtain a given special benefit (as at the designation 800 in FIG. 11), but also can enjoy another benefits such as various kinds of advises and messages. (as at the designation 801 in FIG. 11). In addition thereto, the users are therefore motivated to use the website concerned and purchase goods and services therefrom (as at the designation 802), whereas the entrepreneur (information sender) 103 can constrict a database concerning each of the users (as at the designation 810), so that, if for example the user has won a lottery, the entrepreneur can provide a most adequate gift or prize and service to the user, according to an individual information about that particular user, and that, through such processes, it is possible to increase the number of users who are interested in the entrepreneur's website and thus increase the rate of user's utilization of the entrepreneur's website (as at the designation 811 in FIG. 11), and further, it is possible to reactivate approach or access to the user by using the database (as at the designation 812 in FIG. 11). Furthermore, those processes can effectively lead to an integration between such entrepreneur's virtual activities and real commercial activities of the entrepreneur (as at the designation 813 in FIG. 11).

By employing such embodiment of the first inventive aspect of the present invention, it is possible for the entrepreneur to do the following actions for instance: to invite the users to again visit and use his or her shops (as at the designation 821 in FIG. 11); to make full use of his or her database to give an adequate present to the users (as at the designation 822 in FIG. 11); to give a discount to the users (as at the designation 823 in FIG. 11); and to achieve a business agreement through those appealing activity steps (as at the designation 824 in FIG. 11).

The above description of the present embodiment of the first inventive aspect is dedicated to an example of goods selling activities, but, this is not limitative. For further example, the present embodiment allows its use for a research based on questionnaire, a market research, and, not to mention, for other business aspects including an attempt to increase member registration of the users.

[The Second Inventive Aspect]

Figure 12:
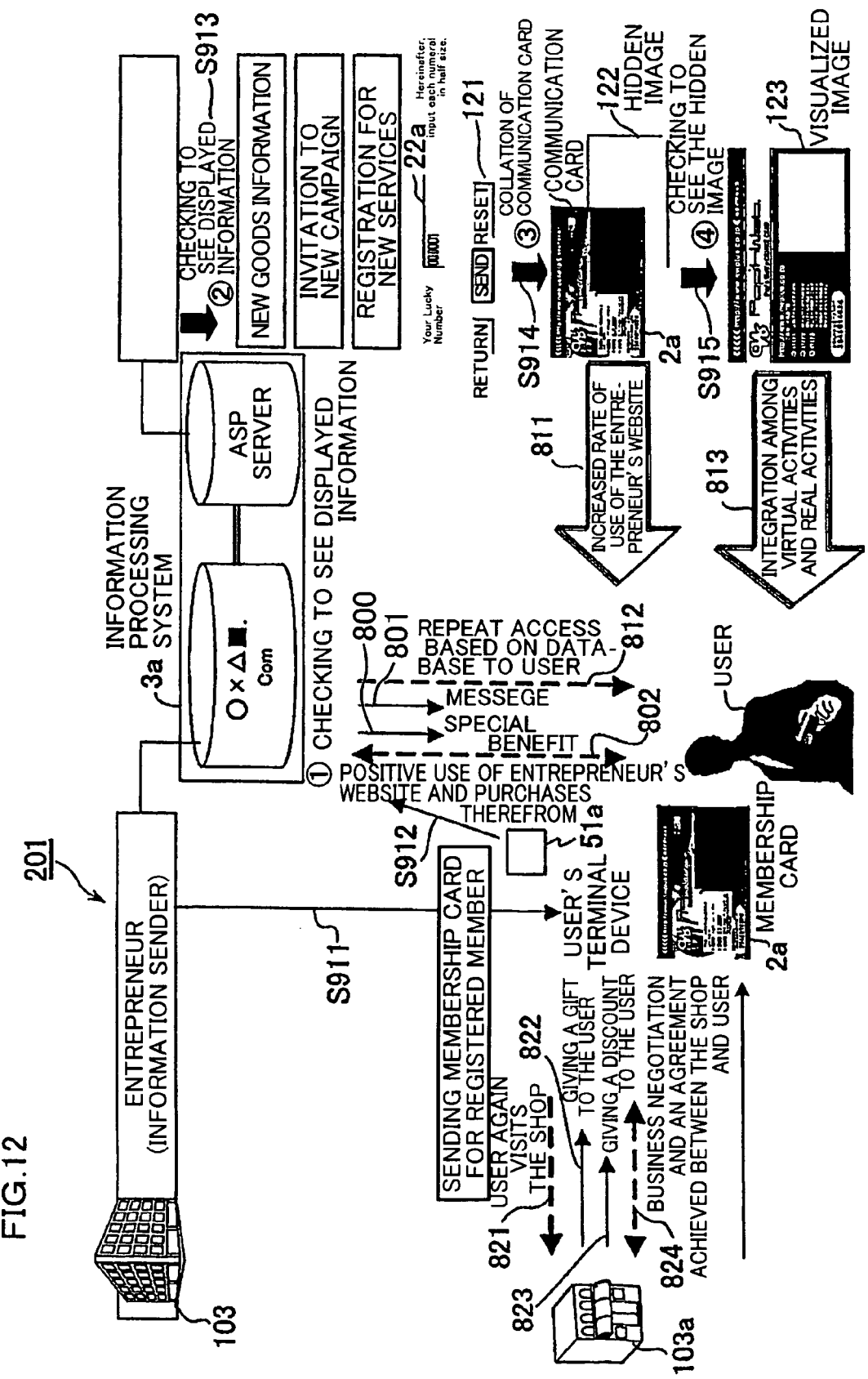
FIG. 12 is a diagram illustrative of a communication card system in accordance with an exemplary embodiment of the second inventive aspect of the present invention.

FIG. 12 is a diagram showing a communication card system in accordance with one embodiment of the second inventive aspect of the present invention. In this respect, as stated previously, the term, "the second inventive aspect", refers to a system for causing a main image data, which has been received in the user's terminal device, to indicate on the afore-stated display means, while simultaneously causing a data of hidden image to indicate on that display means in an invisible state, and also allowing such hidden image appearing on the display means to be visually perceivable by means of the afore-stated second communication card, so that a certain information can be provided to customers through use of the communication card. It is noted that, with regard to each of constituent elements of the present second inventive aspect which are identical to those of the previously described bases respectively of first and second inventive aspects, a description will be made thereof along with the same designations as those used in the basic concepts of first and second inventive aspects.

As shown in FIG. 12, a communication card system 102 in accordance with one embodiment of the present second inventive aspect is arranged such that, on the side of an entrepreneur (information sender) 103, there are provided a second communication card 2a on which are printed various pertinent marks (for specific example, an exclusive lucky number 22 without any other identical number thereto, URLs 24, 25, the name of the card, the explanation of the card, and so forth), and a second information processing system 3a, whereas, on the side of a user, is provided a user's terminal device 51a. It is noted that what is described as "communication card system 201" hereinafter may also include any system in which are provided the second communication card 2a bearing various pertinent marks printed thereon (for example, an exclusive lucky number 22 without any other identical number thereto, URLs 24, 25, the name of the card, and so forth), and the third information processing system 3a, on the side of an entrepreneur (information sender) 103.

In this context, the second communication card 2a, which the entrepreneur (information sender) 103 has to prepare, may be designed and arranged such that a sheet, on which are printed particular URLs 24, 25 as well as marks including particular letters, graphics and symbols (for example, the lucky number 22a, the URLs 24, 25, and so forth), has, provided in a localized area thereof, an optical medium 23a where a hidden image intended for particular communication purpose is plotted. Also, on that second communication card 2a, it is preferable to print the following phrase, as another mark, "When you access to the URL printed on this card 2a, an image appears on the display of user's terminal unit 51. Then, place the card 2a on such image, and you will see a graphic and letters".

The second information processing system 3a, which is provided on the side of the entrepreneur (information sender) 103, is capable of transmission of an information input image data to user(s), with such an arrangement that, after having transmitted such information input image data to the user(s), the processing system 3a per se, upon receipt of a collected information written or inputted in that information input image data, will operate to process any information to be presented to customers or users into a hidden image data and combine or incorporate that hidden image data with or in a main image data so as to create a composite image data, and the system 3a is further not only capable of transmission of an image output data for causing only a main image in the foregoing main image data to be indicated in a visible manner, while causing the foregoing hidden image data to be indicated in an invisible manner; but also arranged such that the foregoing collected information, which is loaded therein, will be classified into particular data in a predetermined way. This second processing system 3a may be owned by the entrepreneur (information sender) 103 or may not be owned by that entrepreneur (information sender) 103, which does not matter insofar as the system 3a has any functions that can be used by any user.

On the other hand, the image display/recognition system 5, which is provided by the user, includes an information input means (a keyboard), a display means for displaying the information input image data and other data to be displayed (a display), and a processing means for executing various required controls and processing various data of information. This image display/recognition system 5 may or may not be owned by a particular user, or alternatively may be a suitable system of other user's insofar as it can be used by any user who so desires.

With regard to the above-described communication card system, a description will now be made of the case where it is used by a user of registered member.

At first, the entrepreneur (information sender) 103 prepares a great number of the second communication cards 2a.

When the user goes to a shop(s) 103a kept by the entrepreneur (information sender) 103, or other associated shop(s) 103a, and answers a questionnaire or applies for registration of membership, the second communication card 2a is sent to the user, as a registered membership card, from the entrepreneur (information sender) 103 (Step 911).

As a nature of such membership card, the second communication card 2a should preferably bear an attractive phrase printed thereon, such as the following phrase: "For example, when you access to the URLs 24, 25 given in the second communication card 2a and input a lucky number, you may win a nice gift." It is noted here that such second communication card 2a should not contain any lucky number 22a identical to other lucky number contained in another second communication card.

Now, the user activates the browser in his or her terminal unit 51a, then inputs into the browser the URL 24 or the URL 25 which appears on the second communication card 2a, and executes all required processes and operations.

Then, a connection is established between the user's terminal device 51a and the second information processing system 3a, so that the user's terminal device 51a can load some information data, such as a data titled by "New Goods Information", "Invitation to New Campaign", "Registration for New Services", or the like, and also obtain an information input image data (Step 912).

Thus, for example, the user's terminal device 51a displays an image of the foregoing information about the "New Goods Information", "Invitation to New Campaign", "Registration for New Services" or the like, while emitting sounds associated therewith, or alternatively indicates the information input image 121 on the display thereof (Step 913).

The user inputs the lucky number 22a into the information input image 121, for example, and clicks on a send button. It is noted that the description in this embodiment relates to such input of the lucky number 22a, but, this is not limitative, and, likewise as in the first inventive aspect, the present second embodiment may allow for inputting of other various required information data and enabling required operations based thereon.

The information data thus inputted and collected (or the lucky number) is transmitted from the user's terminal device 51a to the second information processing system 3a.

Upon receipt of the thus-transmitted information data (or the lucky number), the afore-said second information processing system 3a executes a required processing for a lottery, and processes a data on the result of that lottery into a hidden image data, after which, the system 3a combines that hidden image data with a main image data to create an image output data, and then transmits the image output data to the user's terminal device 51a.

The user's terminal device 51a, when having received such image output data thus transmitted from the second information processing system 3a, indicates the main image data on the above-stated display thereof, while at the same time indicating the hidden image data in an invisible manner upon the display thereof (Step 914). Hence, as shown in FIG. 12, based on that hidden image data, the terminal device 51a indicates a hidden image 122 on the display thereof.

Now, the second communication card 2a is brought to contact upon such hidden image 122 being indicated on the display of the foregoing user's terminal device 51a (Step 915), whereupon, the hidden image 122 is made visible clearly due to the second communication card 2a, so that, as shown in FIG. 2, a visualized image 123 now appears on the screen from that hidden image. As far as the FIG. 2 is concerned, the visualized image 123 consists of the letters "Big win!" and "Congratulations." in two lines, by way of example.

Thus, in accordance with the above-described embodiment of the second invective aspect, the second communication card 2a is given as a communication tool to the user, and by way of such communication tool, the user can not merely obtain a given special benefit (as at the designation 800 in FIG. 12), but also can enjoy another benefits such as various kinds of advises and messages. (as at the designation 801 in FIG. 12). In addition thereto, the users are therefore motivated to use the entrepreneur's website(s) and purchase goods and services therefrom (as at the designation 802 in FIG. 12), whereas the entrepreneur (information sender) 103 can construct a database concerning each of the users, so that, if for example the user has won a lottery, the entrepreneur can provide a most adequate gift or prize and service to the user, according to an individual information about that particular user, and that, through such processes, it is possible to increase the number of users who are interested in the entrepreneur's website and thus increase the rate of user's utilization of the website (as at the designation 811 in FIG. 12), and further, it is possible to reactivate approach or access to the user by using the database (as at the designation 812 in FIG. 12). Furthermore, those processes can effectively lead to an integration between such entrepreneur's virtual activities and entrepreneur's real commercial activities (as at the designation 813 in FIG. 12).

By employing such embodiment of the second inventive aspect of the present invention, it is possible for the entrepreneur to do the following actions for instance: to induce the users to again access and use his or her shops (as at the designation 821 in FIG. 12); to make full use of his or her database to give an adequate present to the users (as at the designation 822 in FIG. 12); to give a discount to the users (as at the designation 823 in FIG. 12); and to achieve a business agreement through those appealing activity steps (as at the designation 824 in FIG. 12).

Further, with the present embodiment of the second inventive aspect, it is possible not only to carry out a long-term campaign to allow the users to positively make access to the entrepreneur's website(s) even after their membership registrations, but also to establish a demand chain management, thereby being able to attain advertisements and co-sponsorship charges from active websites having a considerable number of registered members and/or other entrepreneurs.

The above description of the present embodiment of the second inventive aspect is dedicated to an example of membership card, but, this is not limitative. For further example, the present embodiment allows its use for a research based on questionnaire as well as for a market research.

[The Third Inventive Aspect]

Figure 13:
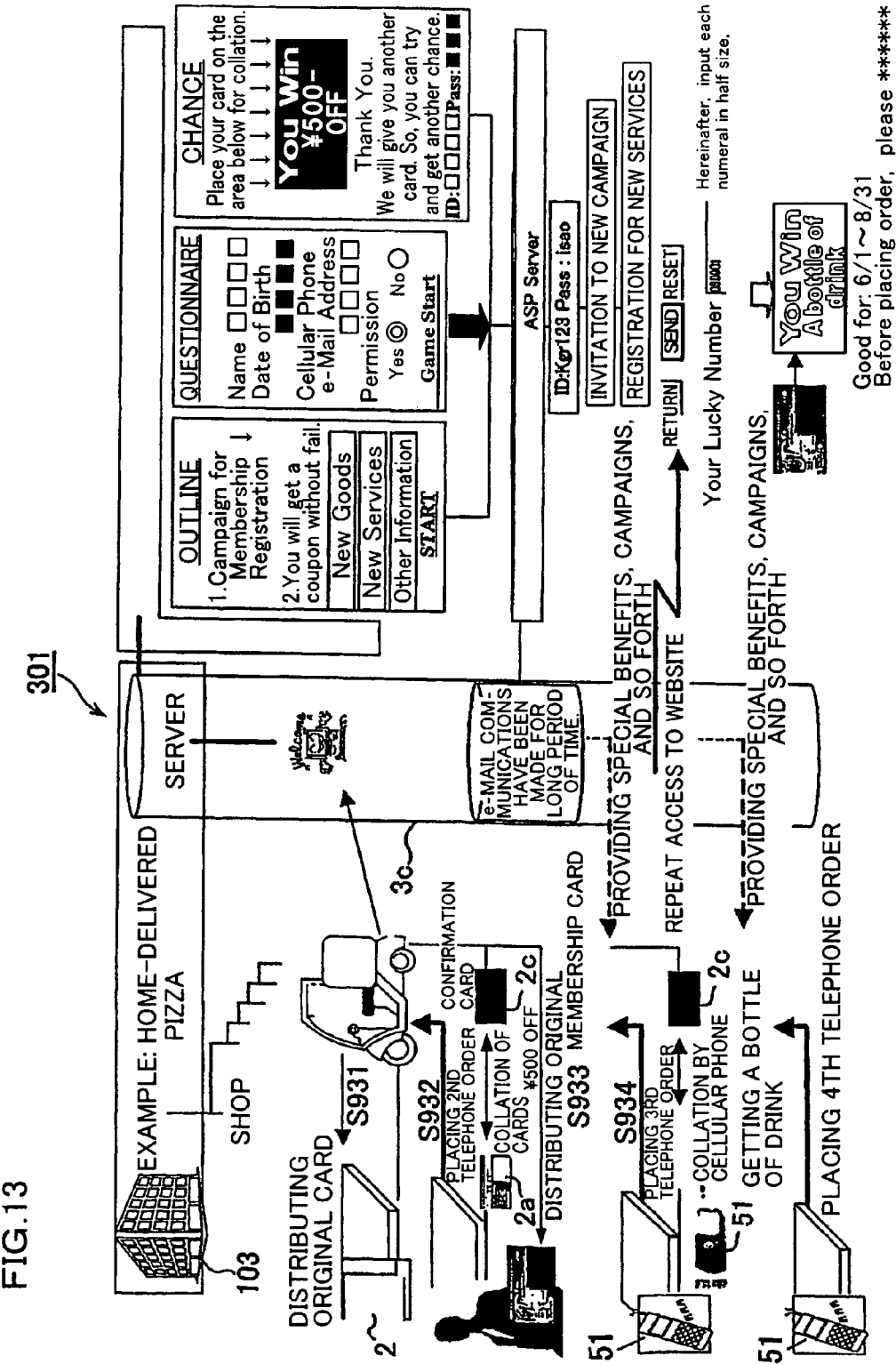
FIG. 13 is a diagram illustrative of a communication card system in accordance with an exemplary embodiment of the third inventive aspect of the present invention.

FIG. 13 is a diagram showing a communication card system in accordance with one embodiment of the third inventive aspect of the present invention. In the present embodiment, the term, "the third inventive aspect", refers to a system of the type which requires a user to utilize first and second communication cards in combination, such that utilizing the first communication card for the display of the user's terminal device causes emission of a predetermined color tone(s) therefrom, whereas, utilizing the second communication card for that terminal device causes indication of a hidden image therefrom, so that the hidden image in the optical medium of the first communication card can be perceived visually, or the hidden image indicated on the display can be perceived visually through the optical medium of the second communication card, thereby imparting to the users or customers either a certain information in the optical medium of the first communication card or a certain information in a hidden image indicated on the display. It is noted that, with regard to each of constituent elements of the present third inventive aspect which are identical to those of the previously described bases respectively of first and second inventive aspects, a description will be made thereof, basically along with the same designations as those used in the basic concept of first inventive aspect and the first inventive aspect as well as in the basic concept of second inventive aspect and the second inventive aspect.

As shown in FIG. 13, a communication card system 301 in accordance with an embodiment of the present third inventive aspect is arranged such that, on the side of an entrepreneur (information sender) 103, there are provided a first communication card 2, a second communication card 2a, wherein, on those two communications 2 and 2a, various pertinent marks are printed (for example, an exclusive check bit number (lucky number) 22 without any other identical number thereto, URLs 24, 25, the name of the card, the explanation of the card, and so forth), and a third information processing system 3a, whereas, on the side of a user, is provided a user's terminal device 51a. Further, in this particular embodiment of the third inventive aspect, there is provided a confirmation card 2c on the side of the entrepreneur (information sender) 103. It is noted that what is described as "communication card system 301" hereinafter may also include any system in which are provided the first and second communication cards 2 and 2a each having various pertinent marks printed thereon (for example, an exclusive lucky number 22 without any other identical number thereto, URLs 24, 25, the name of the card, description of the card, and so forth), and the third information processing system 3c, on the side of an entrepreneur (information sender) 103.

Any further explanation is omitted regarding the first communication card 2 and the second communication card 2a, as they have been described previously. The foregoing confirmation card 2c is formed only in a localized part of the optical medium 23a of the second communication card 2a.

The afore-said third information processing system 3c is capable of transmission of an information input image data to user(s), with such an arrangement that, after having transmitted such information input image data to the user(s), the processing system 3c per se, upon receipt of a collected information written or inputted in that information input image data, will operate to combine a hidden image data with an information output data for causing generation of color tone(s)which can make visible that hidden image in the foregoing optical medium, or with a main image data to be imaged and indicated on display, so as to create an image output data for causing only a main image in the afore-said main image data to be indicated in a visible manner, while causing the afore-said hidden image data to be indicated in an invisible manner, and cause transmission of such image output data, while simultaneously, classifying the foregoing collected information, which has been loaded therein, into particular data in a predetermined way.

On the other hand, the user's terminal device 51 includes an information input means (a keyboard), a display means for displaying the information input image data and other data to be displayed (a display), and a processing means for executing various required controls and processing various data of information. As far as the present embodiment is concerned, such user's terminal device 51 is a cellular phone having a color display, which shall be described hereinafter. p A description will now be made of the abovementioned communication card system 301. The description on that communication card system 301 will be based upon the case where it is applied to a home-delivery service.

At first, the entrepreneur (information sender) 103 manages a home-delivery service, and, when receiving a first order placed by a user for a goods, the entrepreneur 103 delivers the ordered goods, accompanied by the first communication card 2, to the user (Step 931).

Then, the user, who refers to the URLs 24, 25 appearing on the first communication card 2, makes access, based on the URLs, to the information processing system 3c of the entrepreneur (information sender) 103 through his or her terminal device (i.e. cellular phone) 51, and operates that user's terminal device (cellular phone) 51 to cause a given input image data to load thereto from the foregoing third information processing system 3c, thereby causing the input image data to indicate on the display, and thereafter, the user uses the keyboard to input a required information data into the image for inviting the user to input the information data thereinto, wherein such image is indicated on the display and associated with the afore-said information input image data. The information data, which has been inputted in that way and thus collected, is transmitted to the foregoing third information processing system 3c. Upon having received such collected information, the third information processing system 3c transmits to the user's terminal device (cellular phone) 51 an image data for causing emission of a predetermined color tone(s).

Responsive thereto, the user's terminal unit (cellular phone) 51 operates to emit a color tone from the display thereof according to the image output data transmitted from the third information processing system 3c. The user brings the afore-stated first communication card 2 to contact on the display of the terminal unit, so that he or she can visually perceive the hidden image in the optical medium 23 of the first communication car 2. In the present embodiment, the hidden image in the optical medium 23 is the phrase "¥500. OFF", which shall be used for description hereinafter.

The user places a second telephone order with the entrepreneur to request home-delivery of a goods (Step 932). Then, the entrepreneur (information sender) 103, or a manager of the home-delivery service, gives a confirmation card 2c to a deliveryman who in turn goes out with that card for delivery of the ordered goods to the user (Step 933). Then, the deliveryman hands the ordered goods over to the user, and also checks on the first communication card 2 by means of the confirmation card 2c (Step 933). When having checked and seen the image "¥500.OFF" indicated on that card 2 through the confirmation card 2c, the deliveryman receives a ¥500.- discounted amount in cash from the user. At this point, the deliveryman also receives the first communication card 2 from the user and hands a second communication card 2a over to that user, wherein the second communication card 2a serves as an original membership card in place of the first communication card 2 (Step 933).

The user places a third telephone order with the entrepreneur via the user's terminal device (cellular phone) 51 (Step 934). At this stage, the user inputs a lucky number of the second communication card 2a which is the original membership card as stated above, and also inputs other required data. When the user transmits the thus-inputted information data to the third information processing system 3c, the hidden image is indicated on the display of the user's terminal device (cellular phone) 51.

Then, the user puts the second communication card 2a on the hidden image being indicated on the display of the user's terminal device (cellular phone) 51, and checks to see how that hidden image is indicated on the display. In this regard, the indicated hidden image may be the phrase "¥700.OFF", which shall be used as one example hereinafter.

On the other hand, the entrepreneur or a home-delivery service company (information sender) 103 instructs its deliveryman to deliver an ordered goods to the user, together with the confirmation card 2c. At this point, the deliveryman of that home-delivery service company asks the user to operate the user's terminal device (cellular phone) 51 to indicate the hidden image on its display. Then, the deliveryman uses the confirmation card 2c to check and see what is the hidden image in the display, and ascertains that the hidden image is indicated as "¥700.OFF" therein, through the card 2c, so that the deliveryman collects an amount obtained by subtracting ¥700. from a fixed price.

When the user places a fourth telephone order with the entrepreneur, the transaction between the user and entrepreneur should be done in the same way as described above.

According to the communication card system 301 in this particular embodiment of the third inventive aspect, the third information processing system 3c may also execute the following processing: Namely, the third information processing system 3c may execute programs for causing: membership registration; announcement of new goods; announcement of new services; announcement of other information; execution of questionnaire; classification of results of such questionnaire in a predetermined classification way; provision of games; and processing of a lottery for determining win or miss of the lottery.

[Modified Embodiment of the Third Inventive Aspect]

Figure 14:
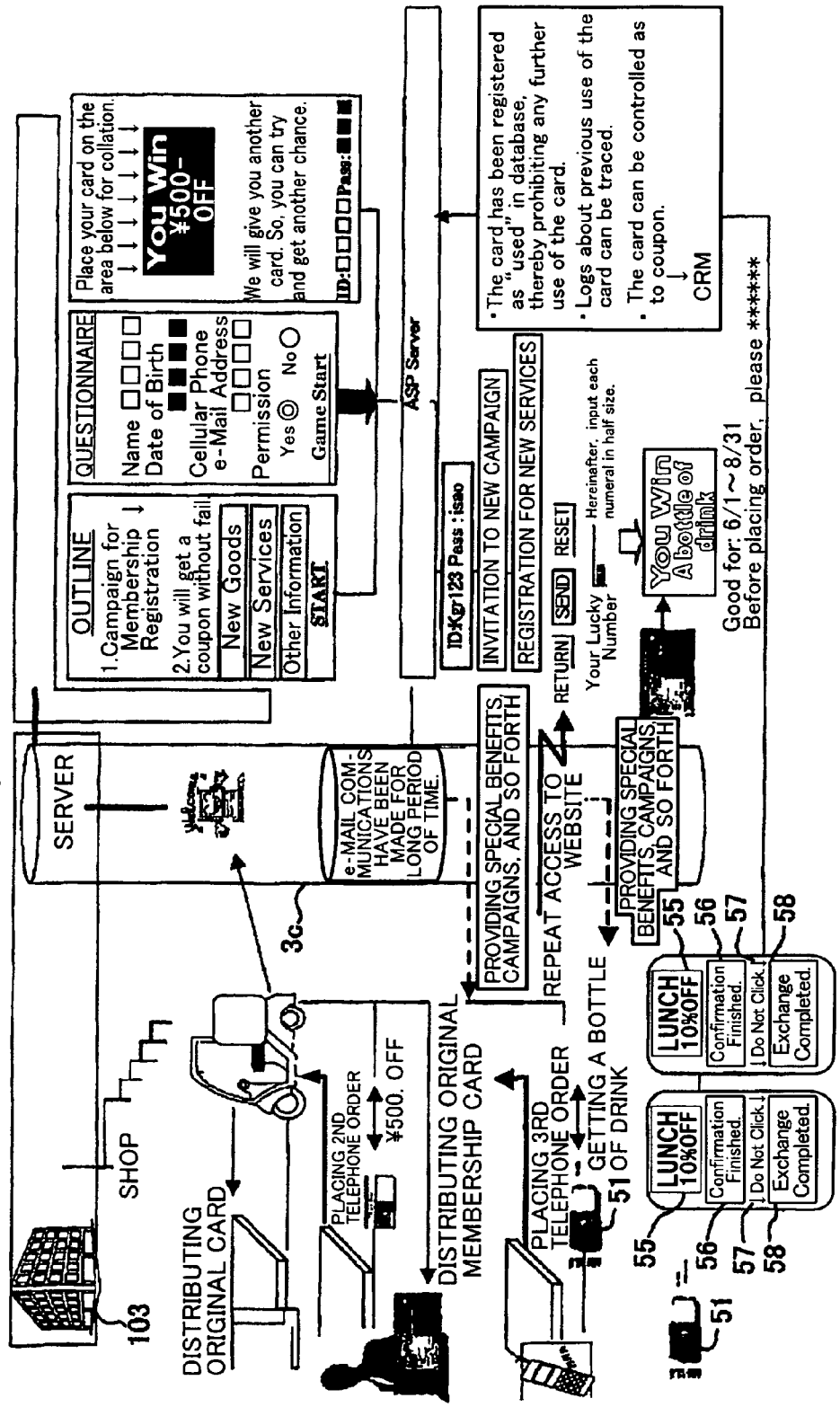
FIG. 14 is a diagram illustrative of a communication card system in accordance with a modified embodiment of the third inventive aspect of the present invention.

FIG. 14 is a diagram illustrative of a communication card system in accordance with a modified embodiment of the third inventive aspect of the present invention.

The communication card system 401 in the present modified embodiment of third inventive aspect is different from the above-described embodiment of the third inventive aspect, in that, in addition to the foregoing hidden image data transmitted from the third information processing system 3c, there are provided a data for causing indication of a confirmation finish button and an exchange completion button in a visualized image associated with the hidden image, so that selecting and clicking on one of the confirmation finish button and exchange completion button is transmitted between the user's terminal unit 51 and the third information processing system 3c. This is a feature of the present modified embodiment, but other arrangement and construction thereof is identical to those of the previously described embodiment of the third inventive aspect.

Namely, in this particular modified mode, at the step of placing the third order, the user operates the user's terminal device (cellular phone) 51 to place the third order with the entrepreneur, at which time, the user inputs required information data (for example, the lucky number) and other data if any. Then, the third information processing system 3c executes a lottery processing and transmits a result of the lottery in the form of hidden image to the user's terminal unit (cellular phone) 51.

When receiving such hidden image data, upon the display of the user's terminal device 51, the following images are indicated: a hidden image 55, a confirmation finish button 56, a warning sentence 57, and an exchange completion button 58.

Then, a deliveryman, who works for the entrepreneur (information sender) or the home-delivery service company 103, brings the confirmation card 2c, for instance, to contact on the hidden image being indicated on the display of the user's terminal device 51, and checks to see what is a visualized image of the hidden image. After confirming the visualized image of hidden image, the deliveryman operates the keyboard to depress or click on the confirmation button 56. At this point, if the user wins a lottery or gets a discount for instance, the deliveryman operates the keyboard to depress or click on the exchange completion button 58. All the information data associated with those operations are transmitted from the user's terminal device (cellular phone) 51 to the third information processing system 3c. This system and arrangement effectively enable the third information processing system 3c to easily ascertain and complete all necessary services to users who win the lottery, by making reference to the lucky number, which therefore not only eliminates any redundant services to the users, but also insures to provide required services to the users.

As described above, the communication card system 401 in accordance with the present modified embodiment of the third inventive aspect has the advantage that the third information processing system 3c effectively checks on and completes all necessary services to users who win a lottery, by making reference to a pertinent lucky number, which therefore precludes the entrepreneurs from doing any redundant services and insures to provide all required services to the users.

[Fourth Inventive Aspect]

FIGS. 15 to 19 are intended to illustrate a communication system in accordance with an embodiment of the fourth inventive aspect of the present invention.

Figure 15:
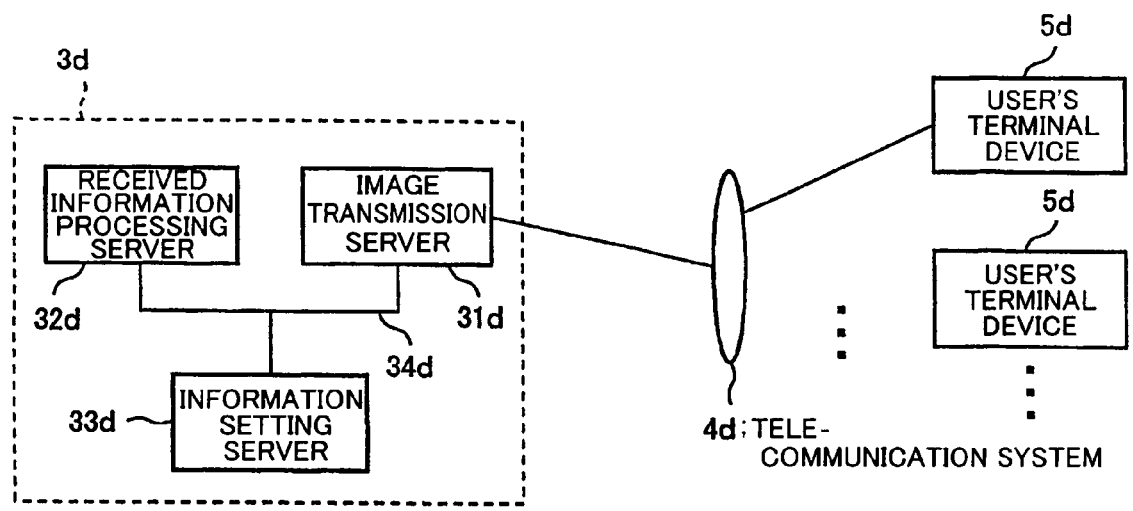
FIG. 15 is a block diagram showing a communication system in accordance with an embodiment of the present invention.

In the present embodiment, FIG. 15 is a block diagram for showing the communication system in accordance with the embodiment of the fourth inventive aspect.

As shown in the FIG. 15, generically stated, the communication system 1d in the present embodiment of fourth inventive aspect is comprised of: a web-based information transmission/processing device 3d; a plurality of user's terminal devices 5d, 5d, . . . ; and a telecommunication system 4d, such as an Internet, which can establish a connection between the web-based information transmission/processing device 3d and those user's terminal devices 5d, 5d, . . . .

In this respect, generically stated, the web-based information transmission/processing device 3d comprises: an image transmission server 31d; a received information processing server 32d; and an information setting server 33d.

While not shown, such image transmission server 31d is provided with a plurality of central processing units, main memories, input/output interfaces, hard disc devices, telecommunication devices, units of LAN (local area network), and so forth. The hard disc devices in that image transmission server 31d each has, stored in memory, an operating system based on a given language and an application program for causing transmission of an image.

In the main memories of the image transmission server 31d, the operating system in each hard disc device is expanded and stored, so that the central processing unit can execute the operating system to provide a basic operation in a predetermined manner, and further, an image transmission application program, which is installed in the hard disc device, is expanded and stored in the main memory, so that the central processing unit can execute that image transmission application program upon the operating system, thereby enabling execution of operation for the image transmission stated above.

The foregoing received information processing server 32d is, though not shown, also provided with a plurality of central processing units, main memories, input/output interfaces, hard disc devices, telecommunication devices, units of LAN, and so forth. The hard disc devices in that image transmission server 32d each has, stored in memory, an operating system based on a given language and an application program for causing transmission of an image.

In the main memories of the received information processing server 32d, the operating system in each hard disc device is expanded and stored, so that the central processing unit can execute the operating system to provide a basic operation in a predetermined manner, and further, an image transmission application program, which is installed in the hard disc device, is expanded and stored in the main memory, so that the central processing unit can execute that image transmission application program upon the operating system, thereby enabling execution of operation for the image transmission stated above.

The afore-said information setting server 33d is also provided with a plurality of central processing units, main memories, input/output interfaces, hard disc devices, telecommunication devices, units of LAN, and so forth, though not shown, with such an arrangement that the central processing unit of that information setting server 33*d* can execute the operating system based on a given language to provide a basic operation in a predetermined manner, and further, execute a received information processing application program upon the operating system, thereby enabling execution of the above-described operation for setting information.

While not shown, the foregoing image transmission server 31*d*, the foregoing received information processing server 32*d*, and the foregoing information setting server 33*d* are connected with one another via a LAN cable(s) 34*d*.

In the present embodiment, the image transmission server 31*d* should at least be provided with a means capable of causing the afore-stated central processing unit to execute the afore-stated image transmission application program so as to basically create: a hidden image data for causing indication of a hidden image on a particular local area of display; and a filter image data for causing indication of a filter image which emits a color tone for making the hidden image visible in other local area than such particular local area in the display, and also capable of transmitting the hidden image data and filter image data to the telecommunication system 4*d* at the address of the terminal device 5*d* by which a user has made access to the image transmission server.

However, practically stated, the image transmission server 31*d* should preferably be provided with: a function capable of creating the hidden image data for causing indication of a hidden image on a particular local area of display and the filter image data for causing indication of a filter image which emits a color tone for making the hidden image visible in other local area than such particular local area in the display; a function capable of creating an information input image data and transmitting such information input image data to the telecommunication system 4*d* at the address of the terminal device 5*d* by which the user has made access to the image transmission server; and a means capable of receiving a collected information data that has been collected from the user in regard to a required information requested for input in the thus-transmitted information input image, and, upon receipt of such collected information data, transmitting the foregoing hidden image data and filter image data to the telecommunication system 4*d* at the address of the user's terminal device 5*d* that has gained access to the image transmission server. Further, when having received the collected information data about the required information in the afore-said information input image data, the image transmission server 31*d* operates to transfer such collected information data to the foregoing received information processing server 32*d*.

The foregoing received information processing server 32*d* is arranged such that its central processing units operate to execute the received information processing application program so as to process the afore-said collected information in a predetermined processing manner and make a database of the thus-processed information.

The foregoing information setting server 33*d* is arranged such that its central processing units operate to execute the information setting application program, thereby providing a required means or processing to the foregoing image transmission server 31*d* and the foregoing received information processing server 32*d*.

It is noted that the foregoing web-based information transmission/processing device 3*d* may or may not be owned by the information sender, and at any rate, it may be any suitable device that allows for communication between the information sender and the user(s) by use of the web-based information transmission/processing device 3*d* and the user's terminal device 5*d*.

Further, each of the foregoing user's terminal devices 5*d*, 5*d*, . . . may, for example, be a desktop personal computer (hereinafter, referred to as "personal computer" or "PC"), laptop PC, mobile computer (computer of mobile type), PDA, or any one of other various kinds of terminal devices. In other words, the user's terminal device 51 may be any kind of terminal device insofar as it includes an information input means for allowing various relevant information to be inputted therein, a display means for displaying information input image data and/or other data to be indicated, and a processing means for processing various controls and information. In any case, the user's terminal device 5*d* itself may be any suitable device insofar as it has an information input means for inputting various kinds of information data, a display means for displaying an information input image data and other data to be imaged and displayed, and a processing means for causing various required controls and processing the information data. Hereinafter, a description on the user's terminal device 5*d* will be based on a desktop-type personal computer.

Figure 16:
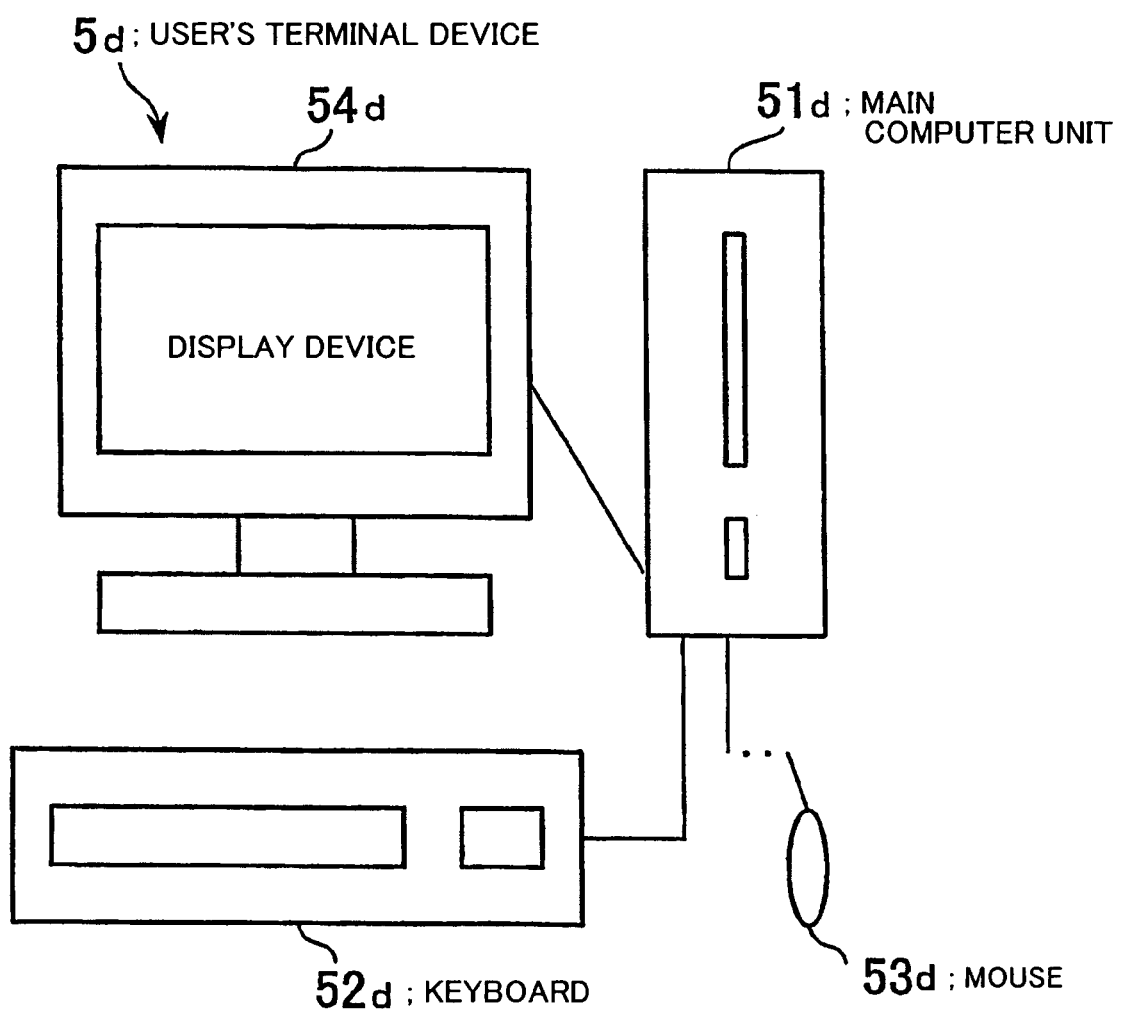
FIG. 16 is a block diagram showing an exemplary construction of user's terminal device used in communication system in the embodiment of the present invention.

FIG. 16 is a block diagram showing one example of arrangement of the user's terminal device used for the communication system in accordance with an embodiment of the fourth inventive aspect of the present invention.

As shown in the FIG. 16, the user's terminal device 51*d* is for example comprised of: a main computer unit 51*d* operable as a processing means for effecting various required processing controls and processing information data; a keyboard 52 and a mouse 53 which are operable as an information input means for inputting various kinds of the information data; and a display device 54 workable as a display means for indicating a data to be imaged and displayed.

While not shown, the main computer unit 51*d* is provided with a central processing unit (CPU), a main memory, input/output interface, hard disc device, and a bus line connecting those elements with one another. Hard disc devices in that main computer unit 51*d* each has, stored in memory, an operating system and a browser program. The browser program is a program for allowing a user to browse a WWW through the telecommunication system (Internet) 4*d*.

When the foregoing main computer unit 51*d* is switched on, the operating system is expanded from the hard disc device to the main memory and stored therein, so that a basic operation is commenced, which in turn causes execution of the browser program, so that the browser program is expanded from the hard disc device to the main memory and stored therein and that the CPU processes the browser program stored in the main memory, thereby causing indication of a browser image on the display device 54*d* for enabling connection with the web information transmission/processing device 3*d*.

When the main computer unit 51*d* of the user's terminal device 5*d* is now placed in the above-described condition and the user operates the keyboard 52*d* to input a given URL in a given input window in the browser image indicated on the display device, the foregoing CPU operates on the basis of the URL so as to gain access to the foregoing web-based information transmission/processing device 3*d* through the telecommunication system 4*d*, then loads a predetermined information input image data from the web-based information transmission/processing device 3*d*, and causes indication of a corresponding information input image on the display device 54*d*, with such an arrangement that, when an information data requested from the information input image have been inputted from the keyboard 52*d* and so forth, the thus-inputted information data is transmitted to the web-based information transmission/processing device 3*d*, and then, the aforementioned hidden image data and filter image data, which are transmitted to the main computer unit responsive to such inputted information data, are imaged and indicated on the display device 54d, after which, the hidden image is processed into a visually perceivable image, thereby making it possible to impart an information intended for communication purpose to the user.

With reference to FIGS. 17 to 20 in conjunction with FIGS. 15 and 16, a description will now be made of operation of the above-constructed communication system.

Figure 17:
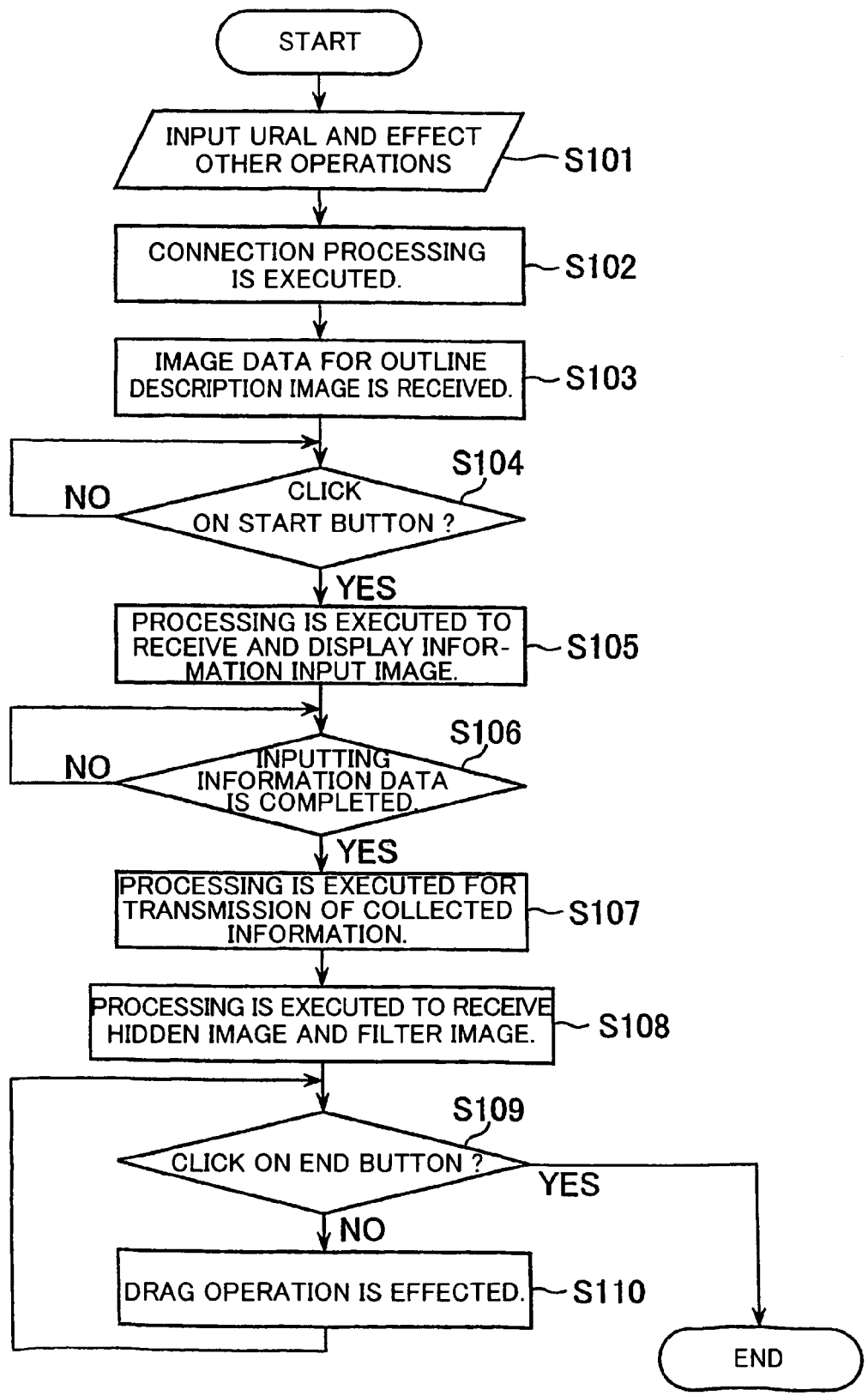
FIG. 17 is a flow chart for explanatorily showing an operation of the user's terminal device of communication system in accordance with the embodiment of the present invention.
Figure 18:
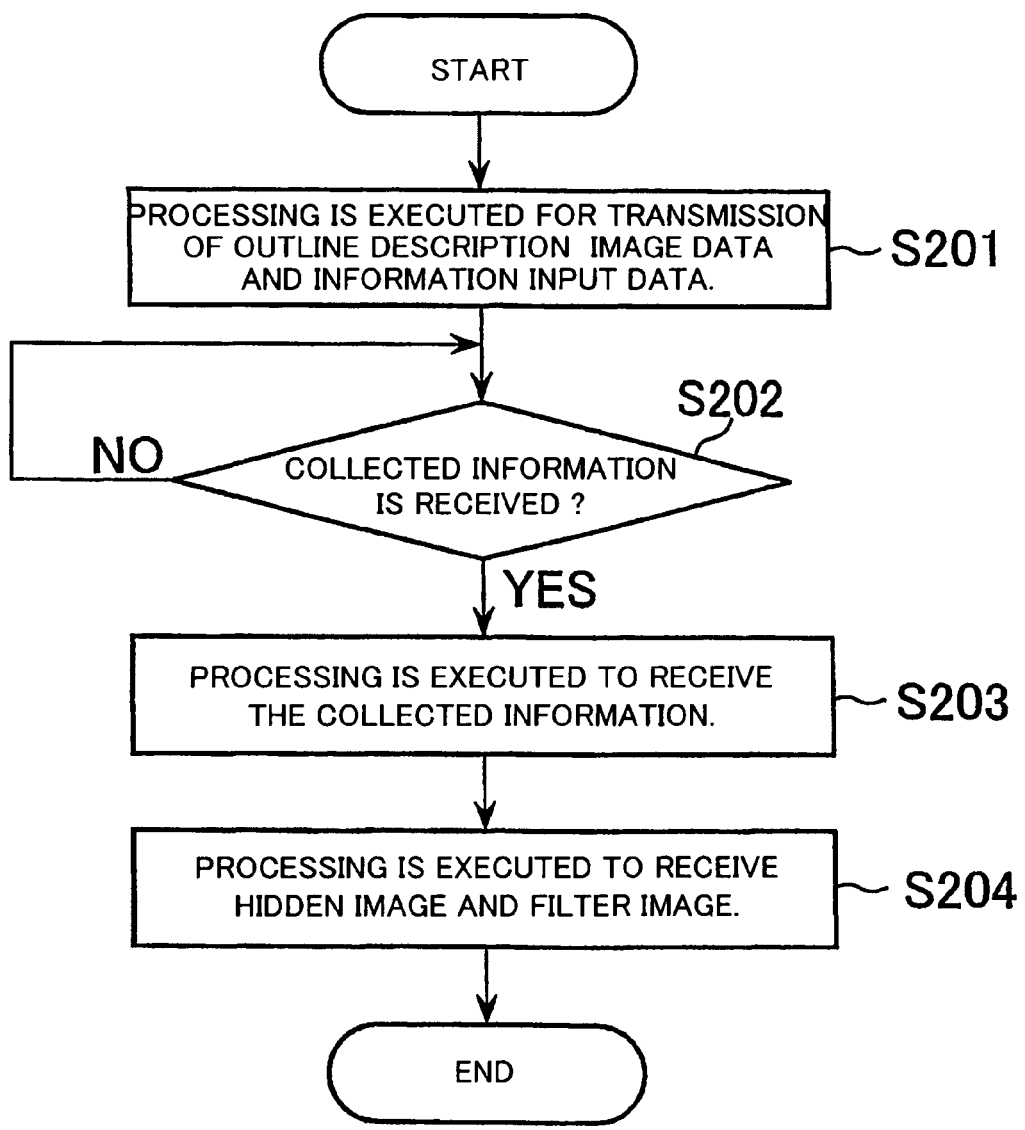
FIG. 18 is a flow chart for explanatorily showing an operation of a web-base information transmission/processing device of communication system in accordance with the embodiment of the present invention.
Figure 19:
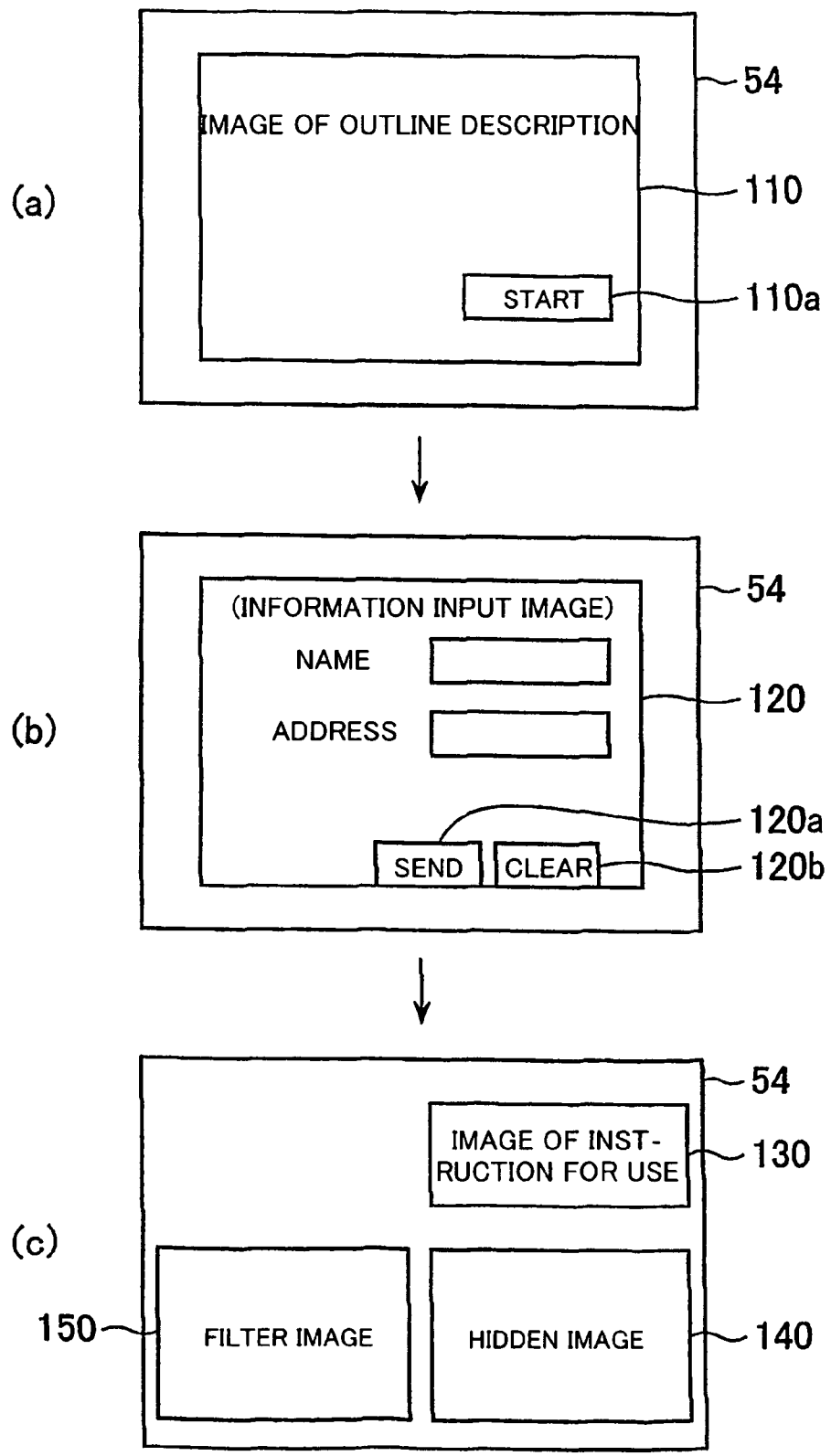
FIG. 19 is a diagram showing an example of image indicated on a display device of the user's terminal device of communication system in accordance with the embodiment of the present invention.
Figure 20:
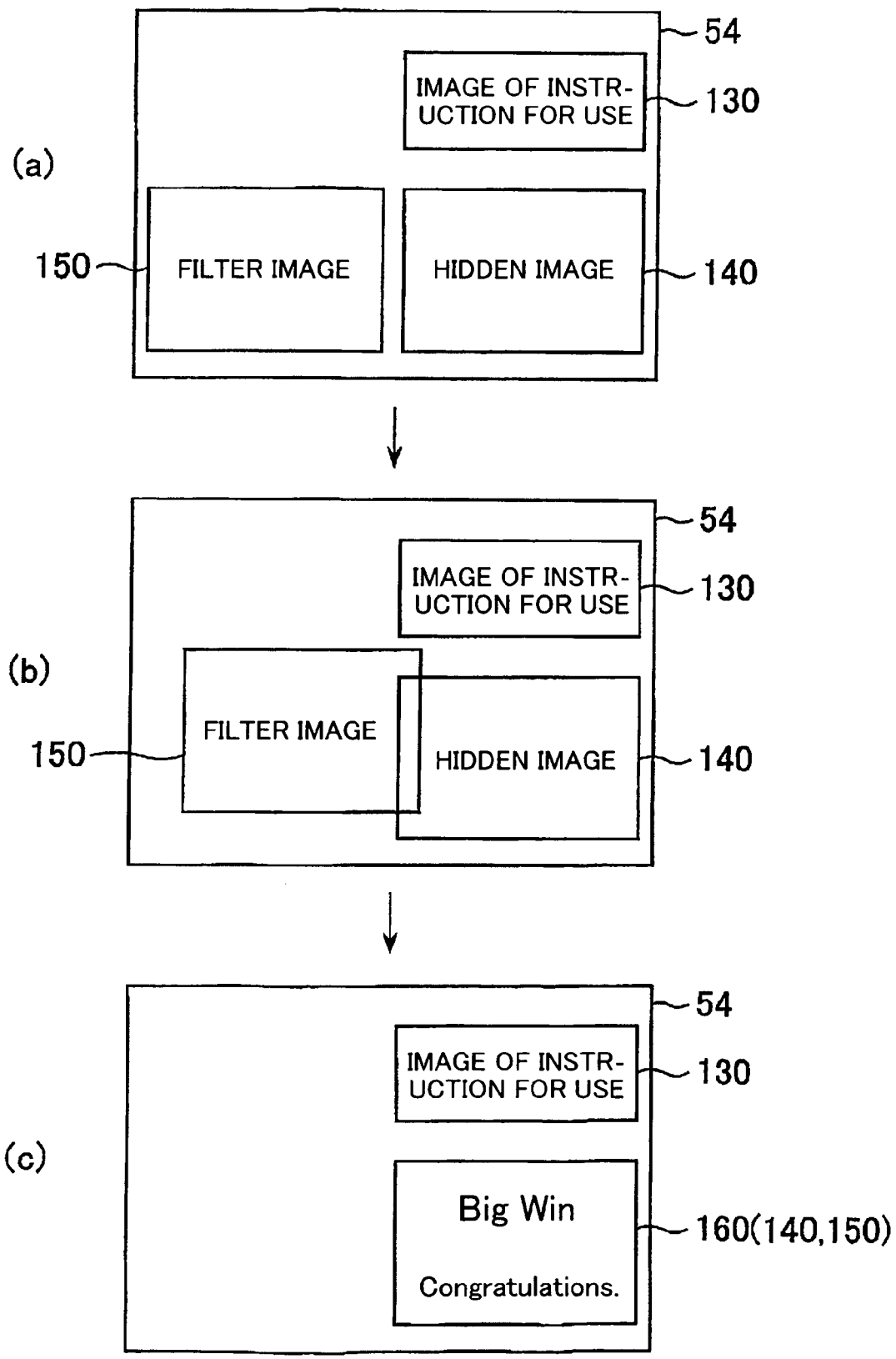
FIG. 20 is a diagram showing another example of image indicated on a display device of the user's terminal device of communication system in accordance with embodiment of the present invention.

FIG. 17 is a flow chart illustrating the operation of the user's terminal device of the communication system in accordance with the present embodiment. FIG. 18 is a flow chart illustrating the operation of the web-based information transmission/processing device of the communication system in the present embodiment. FIG. 19 is a diagram showing an example of image indicated on the display device of the user's terminal device of the communication system in the present embodiment. FIG. 20 is a diagram showing another example of image indicated on the display device of the user's terminal device of the communication system in the present embodiment.

First of all, the information sender operates the information setting server 33d of the web-based information transmission/processing device 3d to arrange that all setting procedures required for communication with the user are effected in the image transmission server 31d and the received information processing server 32d.

Responsive to such setting process, the image transmission server 31d operates to create: a hidden image data for causing indication of a hidden image in a given local area of an image indicated on the display; and a filter image data for causing indication of a filter image that emits a color tone for making visible the hidden image in other local area than such given local area in the indicated image, while simultaneously creating an information input image data. Additionally, the server 31d is provided with a function capable of creating an information input image data and transmitting such information input image data to the telecommunication system 4d with an address of the terminal device 5d by which the user has made access to the image transmission server; and a means capable of receiving a collected information data that has been collected from the user in regard to a required information requested for input in the thus-transmitted information input image, and, upon receipt of such collected information data, transmitting the foregoing hidden image data and filter image data to the telecommunication system 4d with the address of the user's terminal device 5d that has gained access to the image transmission server.

Furthermore, the foregoing image transmission server 31d is provided with a function for receiving the collected information data regarding the required information in the information input image data, and, upon receipt of such collected information data, transferring that particular collected information data to the foregoing received information processing server 32d.

Next, the information sender, who operates the web-based information/processing device 3d, uses various kinds of distribution means in order to notify the users of a URL for access to the web-based information transmission/processing device 3e.

Hereinafter, referring to FIGS. 17, 19 and 20, a description will be made of operation of the user's terminal device 5d.

At first, the user uses the keyboard 52d to input the aforestated URL, which he or she knows through the distribution means, into a given input window of the browser image indicated on the display device 54d of the user's terminal device 5d, and then uses the mouse 53 to click on a go button (at S101 in FIG. 17).

Responsive thereto, the CPU of the user's terminal device 5d executes connection processing for gaining access to the image transmission server 31 of the information processing system 3 (S102 in FIG. 17). Then, after having established connection with the afore-stated web-based information transmission/processing device 3d, the CPU of user's terminal device 5d, first, executes a receiving and indication processing which consists of the steps of: receiving an image data for causing indication of an image of outline description; and then subjecting such image data to imaging and indication on the display device 54d (S103 in FIG. 17).

As a result thereof, the image of outline description 110 is indicated on the display device 54d. This outline description image 110 is an image descriptive of brief explanation about what will be done between the user and information sender, and also descriptive of a warning notice, with a start button image 110a given therein.

The CPU of the user's terminal device 5d checks to ascertain whether the start button image 110a is clicked on, or not (S104, "NO", in FIG. 17).

At this stage, when determining that such start button image 110a has been clicked on (S104, "YES", in FIG. 17), the CPU of user's terminal device 5d executes an information input image data receiving/displaying processing for allowing an information input image data to be received from the image transmission server 31d of the web-based information transmission/processing device 3d, and causing the information input image data to be imaged and indicated on the display device 54d (S105 in FIG. 17), whereupon an input standby state is provided for allowing a user to input a required information (S106, "NO", in FIG. 17).

Then, an information input image 120 is indicated on the display device 54d, as shown in FIG. 19(b). This information input image 120 contains image regions where, for example, the following information data are to be inputted: user's name, address, e-mail address and permission, and also contains a send (start) button image 120a and a clear button image 120b.

At this point, let us assume that the user uses the keyboard 52d and, if required, uses the mouse 53d, so as to input all necessary information data requested in the information input image 120 into all input window images of that particular information input image 120, and then clicks on the send (start) button image 120a.

Then, the CPU of the afore-stated user's terminal device 5d will detect such clicked-on state of the send (start) button image 120a, deactivate the input standby state stated above (S106, "YES", in FIG. 17), and execute processing for transmitting the foregoing inputted information data (collected information) to the web-based information transmission/processing device 3d (S107 in FIG. 17).

In that case, when having completed such transmission processing, the CPU of the user's terminal device 5d receives the above-stated hidden image data and filter image data which are transmitted from the foregoing web-based information transmission/processing device 3d, and executes a filter image data receiving and displaying processing for causing indication of those image data on the display device 54d (S108 in FIG. 17). With this processing, as shown in FIG. 19(c), an image of instruction for use 130, which is descriptive of how to use the indicated images, and a filter image 150 are indicated on the display device 54d. For example, in the instruction image 130, the following explanatory sentence is indicated: "Please drag the filter image 150 and overlay it on the hidden image 140, and you can see letters and graphics."

It is noted that the hidden image 140 is for example an image of oblong shape, which is indicated in an unclear manner and can not be visually perceived as to what is described or drawn therein.

It is also noted that the filter image 150 is for example an image of oblong shape, which emits a color tone for making clearly visible a picture and/or letters given in the hidden image 140.

Further, it is to be noted that the CPU of the foregoing user's terminal device 5d also checks on the clicked state of an end button (S109, "NO", in FIG. 17), and, if the end button is clicked on (S109, "YES", in FIG. 17), the CPU will complete the processing.

At the present stage, when the user uses the mouse 53d to drag the filter image 150, the CPU of the user's terminal device 54d executes proper processing for causing such drag operation (from S109, "NO", to S110 in FIG. 17).

In this context, let us again explain the first stage stated previously. That is, as shown in FIG. 20(a), at first, the instruction image 130, the hidden image 140 and the filter image 150 are indicated on the foregoing display device 54d. Under that initial state, the user uses the mouse 53d to drag the filter image 150 on the display device 54d, and such dragging operation is illustrated in FIG. 20(b).

And further, the user uses the mouse 53d to keep dragging the filter image 150 to the hidden image 140 and then overlays the former on the latter, whereupon, as shown in FIG. 20(c), the hidden image 140 is made visible clearly, which for example visually indicates: "Big Win, Congratulations.".

Referring now to FIG. 18, an operation of the web-based information transmission/processing device 3d will be described.

Upon request for connection from the user's terminal device 5d, the web-based information transmission/processing device 3d starts and executes processing as shown in the flow chart of FIG. 18.

At first, the central processing unit in the image transmission server 31d of the web-based information transmission/processing device 3d executes processing for transmitting the image data for outline description and the information input data, which have been created as stated previously, to the telecommunication system 4d, together with an address of the user's terminal device 5d which has made access thereto (at S201 in FIG. 18), so that an input standby condition is set for allowing the user to input the necessary information required in the information input image data (at S202, "NO" in FIG. 18. In this case, "NO" is repeated.).

At this point, when having received the foregoing collected information data required in the foregoing information input image data from the user's terminal device 5d (at S202, "YES", in FIG. 18), the central processing unit of the image transmission server 31d of the web information transmission/processing device transmits such collected information data to the received information processing server 32d via LAN cable 34d (at S203 in FIG. 18).

Thereafter, the central processing unit in the image transmission server 31d of the web-based information transmission/processing device 3d creates a hidden image data on the basis of a result of a certain lottery processing effected for instance, then transmits the thus-created hidden image data and a filter image data to the telecommunication system 4d, together with an address of the user's terminal device 5d (S204 in FIG. 18), and finally terminates the present processing.

On the other hand, the central processing unit in the received information processing server 32d of the web-based information transmission/processing device 3d operates to make a database of the foregoing collected information according to a predetermined process.

In accordance with the above-described embodiment of the present invention, it is to be appreciated that the filter image 150, which is indicated on the display device 54d of the user's terminal device 5d and emits a given color tone, may be overlaid on the hidden image 140 indicated on the display device 54d, thereby making that hidden image clearly visible, which can provide a pleasure to the users, and such pleasure can effectively induces the users to access a website of the entrepreneur, so that a customer database can be made smoothly, and further, it is possible to provide a communication system and web-based information transmission/processing device which allow for integration of the entrepreneur's website with a relevant shop(s) and/or a goods that the user has purchased.

In the present embodiment, the filter image 150 is an image having the above-described optical property which emits a single color, but this is not limitative. For example, the filter image may be a plurality of images of hamburgers to be advertised, which will be indicated horizontally and longitudinally to give a certain pattern on the display, while emitting certain color tones from that pattern.

[Modified Embodiment of the Fourth Inventive Aspect]

Figure 21:
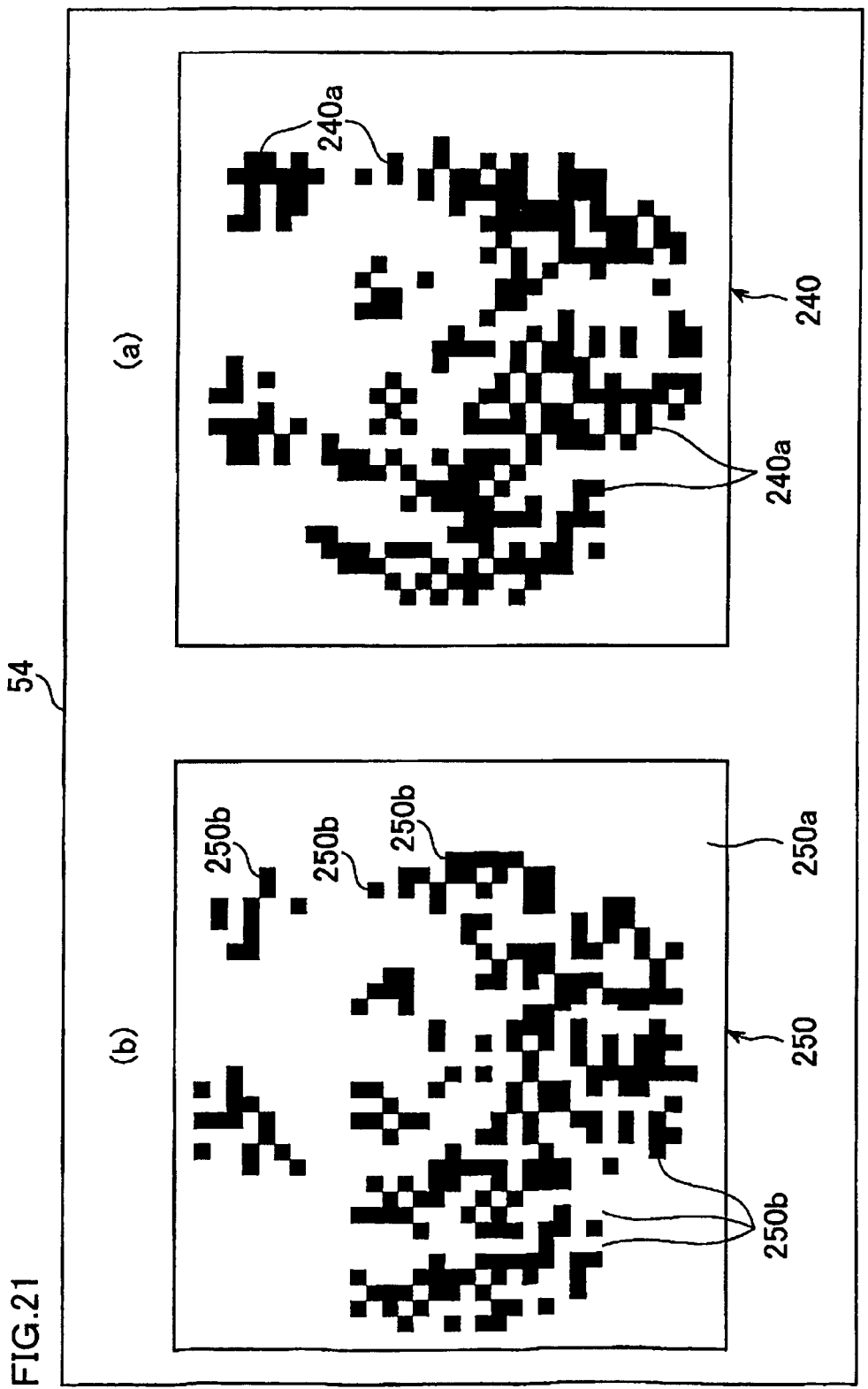
FIG. 21 is a diagram showing a hidden image and a filter image which are indicated on the display device in accordance with a modified embodiment of the present invention.
Figure 22:
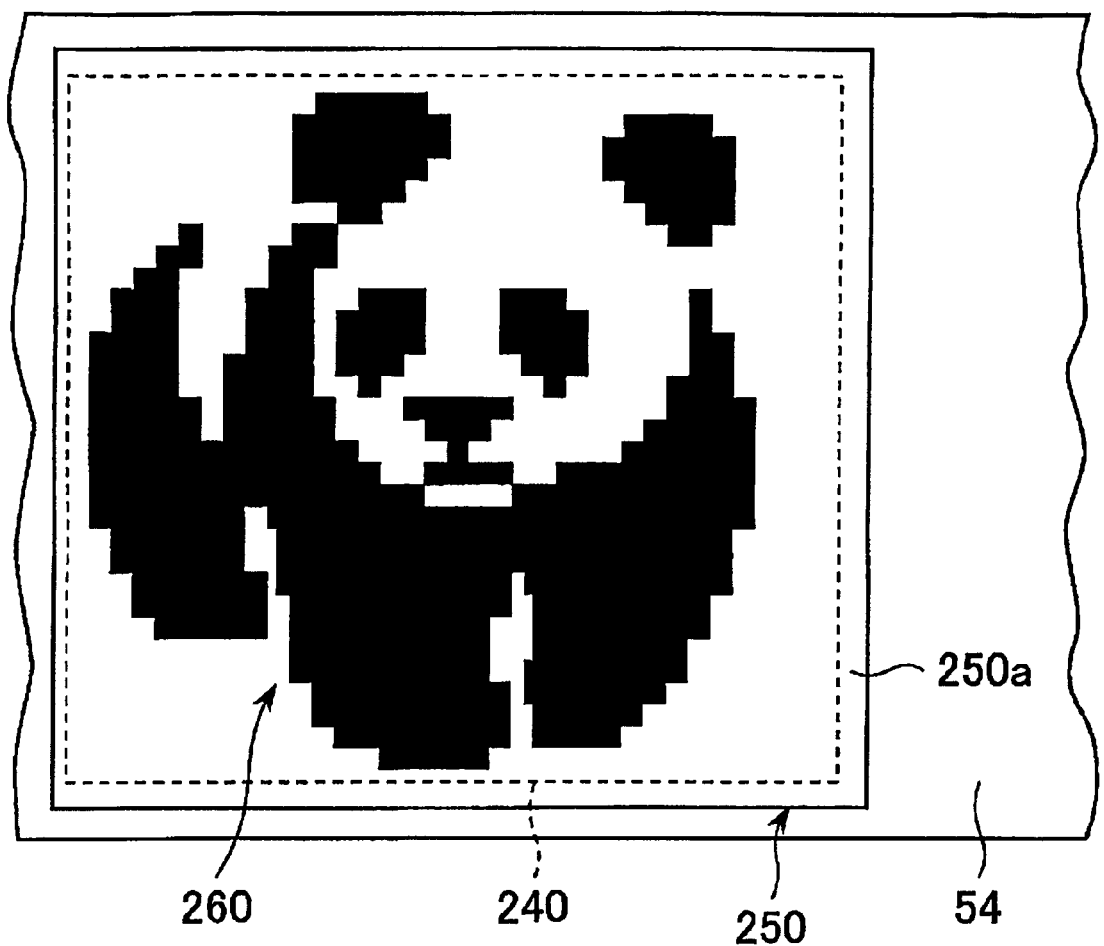
FIG. 22 is a diagram showing the state where the filter image is overlaid on the hidden image indicated on the display device in accordance with the modified embodiment of the present invention.

FIGS. 21 and 22 illustrate a communication system in accordance with a modified embodiment of the fourth inventive aspect of the present invention. The FIG. 21 is a diagram showing a hidden image and a filter image, which are indicated on the display device in accordance with the present modified embodiment of the fourth inventive aspect. FIGS. 21(a) and 21(b) illustrate the hidden image and the filter image, respectively. The FIG. 22 is a diagram showing the state where the filter image is overlaid on the hidden image indicated on the display device in accordance with the present modified embodiment of the fourth inventive aspect.

It is noted that the present modified embodiment of the foregoing fourth inventive aspect is characterized by creating: a hidden image data for causing indication of a hidden image in a given local area of image indicated on the display; and a filter image data for causing indication of a filter image having a transmissive optical property which makes visible the hidden image in other local area than such given local area of image on the display, and then transmitting those hidden image data and filter image to the user's terminal device, so that one visualized image can be indicated on the display. That is, the present modified embodiment features creation of both hidden image and filter image, but other arrangements and systems of the present modified embodiment are entirely identical to those of the previously described embodiments of all the inventive aspects. Thus, it is noted that the communication system 1d shown in FIG. 15 and the user's terminal device 5d shown in FIG. 16 will be used directly in the present modified embodiment of the fourth inventive aspect, and therefore, a description will be made only of difference in indicated images between the present modified embodiment and other previously described embodiments, and any further description is omitted on the common aspects between them.

Now, according to the present modified embodiment of the fourth inventive aspect, the central processing unit in the image transmission server 31d operates to create: a hidden image data for causing indication of a hidden image in a given local area of image indicated on the display; and a filter image data for causing indication of a filter image having a transmissive optical property which makes visible the hidden image in other local area than such given local area of image on the display. Also, in this embodiment, the image transmission server 31*d* of the foregoing web-based information transmission/processing device 3*d* operates to transfer and impart the hidden image data and filter image data to the user's terminal device 5*d* that has made access thereto.

Responsive to such operations of the sever 31*d*, the CPU in the main computer unit 51*d* of the user's terminal device 5*d* operates to transfer and impart the foregoing hidden image data and filter image data to the display device 54*d*, so that those image data can be indicated on that display device 54*d*. Accordingly, it is to be seen that the hidden image 240 shown in FIG. 21(*a*) and the filter image 250 shown in FIG. 21(*b*) are indicated on the display device 54*d*.

Such filter image 250 is formed by a medium 250*a* which has a predetermined area and a transmissive optical property. Specifically, the filter image 250 is formed by the medium 250*a* of transmissive optical property, which has a light transmissive portion disposed therein at a location corresponding to a display point where the hidden image 240 is formed and indicated on the basis of a hidden image data among other images being indicated on the display device 54*d* of the foregoing user's terminal device 5*d*. More specifically, the foregoing optical medium 250*a* may, for instance, be formed by a plurality of light transmissive portions 250*b*, . . . each having a dimensions of 5.0-1 [mm](these light transmissive portions 250*b*, . . . are indicated in black in FIG. 21), which are so arranged as to permit light to be transmitted therethrough at a location corresponding to the display point 240*a* forming the hidden image 240 indicated on the basis of the hidden image data. It is noted here that, besides the light transmissive portions 250*a* . . . , the medium 250*a* may be provided with a dummy light transmissive portion(s) in such a manner as to avoid its preventing visualization of the hidden image, thereby increasing the confidentiality and secrecy of communication. Furthermore, besides the light transmissive portions 250*a* . . . , the medium 250*a* may be arranged such that a desired image is indicated therein to prevent the light transmissive portions 250*a* from being viewed, thereby increasing the confidentiality and secrecy of communication.

Now, a description will be made of operation of the above-described communication system in accordance with the present modified embodiment of the fourth inventive aspect. It is however noted that the information setting processes effected by the information sender and the process to notify the user of URL are entirely identical to those of the previously described embodiments of the present invention, and thus, any further description thereon is omitted.

The user inputs the URL in a browser image indicated on the display device 54*d* of the user's terminal device 5*d*, then establishes connection of the user's terminal device 5*d* with the image transmission server 31*d* of the web-based information transmission/processing device 3*d*, and operates the terminal device 5*d* such that, from the web-based information transmission/processing device 3*d*, a data on how to use the present communication system is downloaded thereto. Then, watching images indicated on the display device 54*d* of the user's terminal device 5*d* and listening to voices and sounds generated from the speaker of that terminal device 5*d*, the user understands how to use the present communication system.

Thereafter, when the user operates the terminal device 5*d* for next operation step, the CPU in the main computer unit 5 Id of that terminal deice 5*d* executes required processing which consists in receiving an information input image data from the web-based information transmission/processing device 3*e* and causing indication of the information input image data on the display device 54*d*.

Then, with respect to information required in an information input image indicated on the display device 54*d*, the users inputs necessary information data in the information input image, and thereafter, the user's terminal device 5*d* processes the thus-inputted information data as a collected information and transmits it to the image transmission server 31*d* of the web-based information transmission/processing device 3*d*. Upon receipt of the collected information, the image transmission server 31*d* of web-based information transmission/processing device 3*d* transfers that collected information to the received information processing server 32*d*, while at the same time transmitting a hidden image data and a filter image data to the user's terminal device 5*d*.

The CPU in the afore-stated main computer unit 51*d* of the user's terminal device 5*d* transfers the hidden image data and filter image data, which have been transmitted from the foregoing image transmission server 31, to the display device 54*d*, and effects display control such that a hidden image 240 and a filter image 250 are indicated on that display device 54*d* so as not to overlap each other (see FIG. 21). As a result thereof, the display device 54*d* indicates the hidden image 204 as shown in FIG. 21(*a*) and the filter image 250 as shown in FIG. 21 (*b*), thereon.

Then, the user uses the mouse 53*d* to drag the filter image 250 shown in FIG. 21(*b*) and overlay it on the hidden image 240 shown in FIG. 21(*a*), whereupon the hidden image 240 and the filter image 250 overlap each other to form one clearly visible image 260 as shown in FIG. 22.

As far as the shown modified embodiment is concerned, the visualized image 260 is indicated in the form of "figure of panda". Such visualization of the visible image 260 is based on the reason that the display device is controlled such that the location of luminous or light emission points 240*a*, 204*a*, . . . of the hidden image 240 shown in FIG. 21(*a*) (which are indicated in black in that figure) are maintained in a predetermined positional relation with the location of luminous or light transmissive points 250*b*, . . . of the optical medium 250*a* of the filter image 250 shown in FIG. 21(*b*), thereby making visible the hidden image 240 in the form of "figure of panda" in black color, which is therefore indicated as the visualized image 260 as shown in FIG. 22.

As described above, in accordance with the communication system 1*d*, it is appreciated that the hidden image 240 and the filter image 250 are indicated separately from each other upon a same image being indicated on the display device 54*d*, and the filter image 250 is overlaid on the hidden image 240 by operation of user, thereby enabling the user to visually perceive an information intended for particular communication purpose which is indicated on the display device 54*d* of the user' terminal device 5*d*.

In this connection, for example, the foregoing hidden image 240 may be a graphics of hamburgers to be advertised, such that a plurality of the hamburger pictures are orderly arranged in horizontal and longitudinal directions to provide a certain pattern image, and an information data intended for particular communication purpose (which is created by light emitting points 240*a*, . . . ) is indicated in such hamburger picture pattern, and that for example, the foregoing filter image 250 may also be the graphics of hamburgers to be advertised, such that a plurality of the hamburger pictures are orderly arranged in horizontal and longitudinal directions to provide a certain pattern image, and the light transmissive points 250*b* thereof are located in correspondence with the light emitting points 240*a*, . . . in such hamburger picture pattern.

In that way, the user can perceive the information and thus can obtain a given information on the basis of the perceived information. It is noted here that processing of a customer' information, which is to be effected by the afore-stated received information processing server 32d, should be done in the same way as that of the previously described embodiment of the fourth inventive aspect.

Accordingly, in accordance with the modified embodiment of the fourth inventive aspect, the image transmission server 31d operates to transmit to the user's terminal device 5d the hidden image data for causing indication of a hidden image and the filter image data for causing indication of a filter image, while on the user's side, the hidden image 240 and filter image 250 are indicated on the display device 54d, and the filter image data 250 can be overlaid on the hidden image 240 by the user, so that a data intended for particular communication purpose can be given to the user.

Such modified embodiment of the fourth inventive aspect also achieves the same advantages as those of the previously described embodiment of the fourth inventive aspect.

Further, in accordance with the embodiment and modified embodiment of the present inventive aspect, the following advantages can be achieved:

(1) The hidden image 240 and the filter image 250 can be created in any desired way on the side of the image transmission server 31d, thereby attaining a high freedom for changing a image intended for particular information purpose.

(2) A moving hidden image can be indicated, and it is possible to effectively render the hidden image perceivable visually.

[Another Embodiment of the Present Inventive Aspect]

The foregoing embodiments of the present inventive aspect and the modified embodiments thereof have been described on the basis of off-line system, but they may be arranged by an on-line system. Namely, in accordance with another embodiment of the present inventive aspect, the web-based information transmission/processing device 3d may be arranged such that an information intended for particular communication purpose is processed as a hidden image data, then, a filter image data is created, which has an optical property that can optically match that hidden image data for visualization of a hidden image in the hidden image data, after which, such filter image data is stored in a recording or memory medium, such as video tape, CD-ROM, CD-R, CD-RW, or DVD, and then, the memory medium is delivered to the user's terminal device 5d, so that an image data stored in the memory medium can be imaged and reproduced by the user's terminal device 5d, which will in turn cause indication of the hidden image 240 and filler image 250 on the display device 54d of that user's terminal device 5d, in which case, overlaying those two images on each other will result in making a hidden image visible clearly and thus giving an information intended for particular communication purpose to the user. In that case, in order to receive an information from the user, an electronic mail, a facsimile, or an ordinary postal mail may be used.

Accordingly, the present another embodiment can achieve the same effects and advantages as in the previously described embodiment and modified embodiment of the present inventive aspect.

[Applied Example of the Present Invention]

Figure 23:
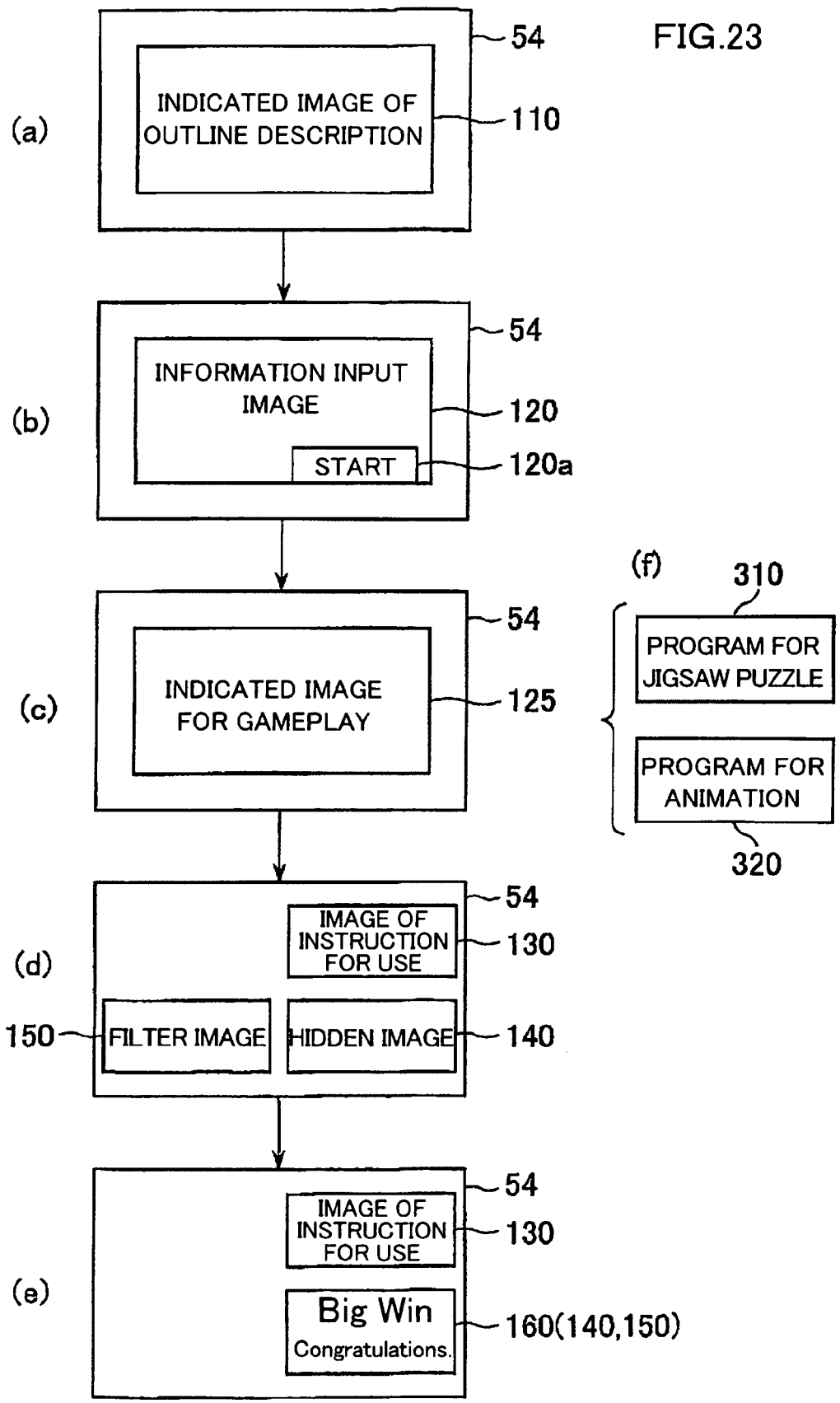
FIG. 23 is a diagram for explanatorily showing a flow of steps for indicating images in communication system in accordance with an applied example associated with the embodiments of the present invention.

FIG. 23 is a diagram showing how images are indicted in a communication system in accordance with an applied example where the previously described embodiments of the present invention are applied to a particular case to be stated below.

The communication system in the present applied example, as shown in the FIG. 23, also employs the communication system shown in FIG. 15 and the user's terminal device 5d shown in FIG. 16, and therefore, a description is omitted about such hardware in the present applied example.

In accordance with the present applied example associated with the previously described embodiments of the present invention, it is arranged such that the web information transmission/processing device 3d first operates to provide an "outline description image" to the user's terminal device 5d, causing indication of such image on the display of the latter, then asking the user to cause indication of an "input image for inputting data in a questionnaire" thereon in order that necessary information data may be collected from the user, after which, when the information data have been collected, the image on the display is changed to an "image for gameplay", and that, after the game has been enjoyed and completed, the hidden image 140 and the filter image 150 are next indicated on the display. Thus, when the game has been finished, the user operates the terminal device to overlay the filter image 150 on the hidden image 140, wherein those two images are being indicated on the display device 5d, whereby, for example, the following image appears: "Big Win, Congratulations."

Referring now to FIG. 23, a specific description will be made of the above-described communication system of the present applied example. In the FIG. 23, designation 54 denotes a display device of the user's terminal device 5d.

It is noted that the processing for setting information which is to be effected by the information sender and the way for notifying the user of URL are entirely identical to those of the previously described embodiments of the present invention.

The user inputs the URL in a browser image indicated on the display device 54d of his or her terminal device 5d, then establishes connection of the terminal device 5d with the image transmission server 31d of the web-based information transmission/processing device 3d, and operates the terminal device 5d to arrange that a data on how to use the present communication system is downloaded from the web-based transmission/processing device 3d to that user's terminal device 5d. Such operation results in the indication of an outline description image 110 as shown in FIG. 23(a). Further, in addition to the outline description image 110, the pertinent outline is simultaneously explained via voice from a speaker. Hence, the user can understand how to use the present communication system from the image 110 and the voice.

Then, when the user effects a next operation of his or her terminal device 5d, the CPU of the main computer unit 51d of that user's terminal device 5d operates to receive an information input image data from the web-based information transmission/processing device 3d, and executes a processing for causing indication of that information input image data on the display device 54d. As a result thereof, there appears an information input image 120 on the display device 54d, which is for example representative of an input image for inputting data in a questionnaire as shown in FIG. 23(b).

With respect to required information data requested in the indicated information input image 120 on the display device 54d of the foregoing user's terminal device 5d, the user inputs all necessary information data therein, with the result that the user's terminal device 5d processes the thus-inputted information data as a collected information and transmits the collected information to the image transmission server 31d of the web-based information transmission/processing device 3d. Upon receipt of that collected information, the image transmission server 31d of the web information transmission/processing device 3d transfers such collected information to the received information processing server 32d, while at the same time transmitting a game program. In this case, as shown in FIG. 23(f), the game program may be selected from various game programs, such as a jigsaw puzzle program 310, or an animation program 320 having a certain story and some selection points, for instance, which may be selected from a proper one of the various game programs, depending on a result of questionnaire, a purpose of market research, and/or character.

A game data (the jigsaw puzzle program 310 for instance), which is selected and set by the information setting server 33d, is transmitted from the image transmission server 31d of the web information transmission/processing device 3d to the user's terminal device 5d.

When having received such game data, the CPU in the main computer unit 51d of the user's terminal device 5d operates to expand the game data and store it in a main memory, and executes the game program on that main memory. Then, there appears such game image 125 as shown in FIG. 23(c) on the display device 54d.

At this stage, the user uses the mouse 53d and keyboard 52d to enjoy playing a game in the game image 125 indicated on the display device 54d. When the user has completed the game, in the game image 125, the CPU in the main computer unit 51d of the user's terminal device 5d communicates the completion of the game to the web information transmission/processing device 3d.

Upon receipt of such communication, the image transmission server 31d of the web-based information transmission/processing device 3d executes a predetermined processing to effect a lottery, and transmits a filter image data and a hidden image data to the user's terminal device 5d, the hidden image data including a data associated a result of the lottery therein.

Then, the CPU in the main computer 51d of the foregoing user's terminal device 5d operates to transfer the hidden image data and filter image data, which have been transmitted from the foregoing image transmission server 31d, to the display device 54d, and instructs the display device 54d to indicate an image of instruction for use 130 which is descriptive of how to use a filter image, a hidden image 140 and the filter image 150 in one image indicated on the display device 54d, as shown in FIG. 23(d), such that those three images do not overlap one another. Thus, as indeed shown in the FIG. 23(d), on the display device 54d, the instruction image 130 for filter image, the hidden image 140 and the filter image 150 are indicated.

The user uses the mouse 53d, as shown in FIG. 23(d), to drag the filter image 150 and overlay it on the hidden image 140. Then, as shown in FIG. 23(e), the filter image 150 is superposed or overlaid on the hidden images 140, whereupon, for example, one visualized image 160, "Big Win. Congratulations." is indicated therefrom.

Thus, in accordance with the present applied example for the embodiments of the present invention, it is to be appreciated that, in addition to inputting a data in questionnaire, the user can enjoy playing a game, and that, when the game is completed, a result of lottery is indicated as the hidden image 140 on the display, while simultaneously, the filter image 150 is indicated on the display in a spaced-apart and adjoining relation with that hidden image 140, thereby allowing the user to overlay the filter image 150 on the hidden image 140 so as to cause indication of a visualized image 160 which enables the user to visually notice the result of lottery and thus gives a certain pleasure to the user. This system indeed effectively induces the user to access a website(s) of the information sender, and further allows the entrepreneur to easily collect and obtain information about the user(s), which in turn allows him or her to easily construct a database of customers. Additionally, it is possible to provide a communication system and web-based information transmission/processing device which enables the entrepreneur to integrate his or her website (s) with relevant shop(s) and/or goods purchased by the user (s).

APPLICABILITY FOR INDUSTRIAL USES

As described above, in accordance with the inventions described in claims 1 and 2, the first communication card is given as a communication tool to the user, and by means of such communication tool, the user can not merely obtain a given special benefit, but also can enjoy another benefits such as various kinds of advises and messages. In addition thereto, the users are therefore motivated to use the entrepreneur's website(s) and purchase goods and services therefrom, whereas the entrepreneur (information sender) can construct a database concerning each of the users, so that, if for example the user has won a lottery, the entrepreneur can provide a most adequate gift or prize and service to the user, according to an individual information on that particular user as well as to a preference of the user, and through such processes, it is possible to increase the number of users who are interested in the entrepreneur's website.

In accordance with the inventions described in claims 3 and 4, the second communication card is given as a communication tool to the user, and by way of such communication tool, the user can not merely obtain a given special benefit, but also can enjoy another benefits such as various kinds of advises and messages. In addition thereto, the users are therefore motivated to use the entrepreneur's website(s) and purchase goods and services therefrom, whereas the entrepreneur (information sender) can construct a database concerning each of the users, so that, if for example the user has won a lottery, the entrepreneur can provide a most adequate gift or prize and service to the user, according to an individual information on that particular user as well as to a preference of the user, and through such processes, it is possible to increase the number of users who are interested in the entrepreneur's website.

In accordance with the inventions described in claim 5, a communication tool is provided to the users, which is capable of displaying a hidden image and a filter image at the same time, such that those two images are indicated in a spaced-apart and adjoining relation with each other, and by means of such communication tool, the user can not merely obtain a given special benefit, but also can enjoy another benefits such as various kinds of advises and messages. In addition thereto, the users are therefore motivated to use the entrepreneur's website(s) and purchase goods and services therefrom, whereas the entrepreneur (information sender) can construct a database concerning each of the users, so that, if for example the user has won a lottery, the entrepreneur can provide a most adequate gift or prize and service to the user, according to an individual information on that particular user as well as to a preference of the user, and through such processes, it is possible to increase the number of users who are interested in the entrepreneur's website.

In accordance with the invention described in claim 6, it is possible to attain the effect that there is provided a web-based information transmission/processing device capable of transmitting the hidden image data and the filter to the user's terminal device(s) that has made access thereto, which means that, in effect, those hidden and filter data can be transmitted from the web-based information transmission/processing device to the user's terminal device(s) that has made access to the former, which in turn proves the capability of such device to transmit an information which effectively can induce the user(s) to positively use the entrepreneur's website and purchase goods therefrom.

In accordance with the invention described in claim 7, it is possible to attain such effect that there is provided a wed-based information transmission/processing device which is capable of: transmitting an information input image data; and receiving an information data required in that information input image data and treating that particular information data as a collected information data, with such an arrangement that, upon receipt of such information data, an hidden image data which hides a particular information therein and a filter image data are transmitted to the user's terminal device(s) that has/have made access to the web-based information transmission/processing device, thereby inducing the user(s) to positively use the entrepreneur's website(s) and purchase goods therefrom, and also enabling easy construction of a database concerning the user(s).

The invention claimed is:

1. A communication system comprising:
   a web-based information transmission/processing device that:
      generates visually encrypted image data that causes indication of a visually encrypted image in a portion of a predetermined area of an image being displayed,
      generates filter image data that causes indication of a filter image emitted in at least one color tone that makes said visually encrypted image visible in the other portion of said predetermined area of said image being displayed,
      generates information input image data,
      transmits said information input image data, and, upon receipt of collected information data concerning an information data required in the thus-transmitted information input image data, transmits said hidden image data and said filter image data; and
   a terminal device connected to said web-based information transmission/processing device via a telecommunication system, having:
      an information input image for allowing various required information data to be inputted thereinto;
      a display for displaying information input image data and other data to be displayed; and
      a controller that controls and processes information data;
   wherein said terminal device accesses said web-based information transmission/processing device on the basis of a URL inputted thereinto causing a predetermined information input image data to load into the terminal device from said web-based information transmission/processing device causing indication of said predetermined information input image data on said display and, upon an information data having been inputted thereinto in response to the information required by said information input image data, transmitting said information data to said web-based information transmission/processing device; and
   wherein said terminal device displays said visually encrypted image data and said filter image data on said display means, and said visually encrypted image is visually decrypted by overlaying the filter image over the visually encrypted image to provide information intended for particular communication purpose.

2. A web-based information transmission/processing device, comprising:
   a controller that generates a visually encrypted image data for causing indication of a visually encrypted image in a portion of a predetermined area of an image being displayed, and a filter image data for causing indication of a filter image which is to be emitted in at least one color tone for making said visually encrypted image visible in the other portion of said predetermined area of said image being displayed; and
   a transmitter that transmits said hidden image data and said filter image data to a telecommunication system in a direction to a terminal device which makes access to the web-based information transmission/processing device.

3. A web-based information transmission/processing device, comprising:
   a controller that:
      generates visually encrypted image data for causing indication of a visually encrypted image in a portion of a predetermined area of an image being displayed;
      generates filter image data for causing indication of a filter image which is to be emitted in at least one color tone for making said visually encrypted image visible in other area than said predetermined area of said image being displayed; and
      information input image data; and
   a transmitter that transmits said information input image data, and, upon receipt of a collected information data concerning an information data required in said information input image data, the transmitter transmits said visually encrypted image data and said filter image data to a telecommunication system in a direction to a terminal device which connected to the web-based information transmission/processing device.

* * * * *